(12) United States Patent
LoSasso et al.

(10) Patent No.: US 6,755,659 B2
(45) Date of Patent: Jun. 29, 2004

(54) INTERACTIVE TRAINING SYSTEM AND METHOD

(75) Inventors: Mark LoSasso, Havertown, PA (US); Chris Tate, New Canaan, CT (US); Michael Urbisci, King of Prussia, PA (US); Michael LoSasso, Havertown, PA (US); Martin Witiak, Royersford, PA (US)

(73) Assignee: Access Technologies Group, Inc., Norwalk, CT (US)

( * ) Notice: Subject to any disclaimer, the term of this patent is extended or adjusted under 35 U.S.C. 154(b) by 0 days.

(21) Appl. No.: 09/903,893

(22) Filed: Jul. 12, 2001

(65) Prior Publication Data

US 2003/0008266 A1 Jan. 9, 2003

Related U.S. Application Data

(60) Provisional application No. 60/303,275, filed on Jul. 5, 2001.

(51) Int. Cl.[7] ........................... G09B 19/00; G06F 17/60
(52) U.S. Cl. ....................... 434/219; 434/322; 434/350; 705/11
(58) Field of Search ................................. 434/118, 322, 434/107, 236, 219; 705/11

(56) References Cited

U.S. PATENT DOCUMENTS

| | | | |
|---|---|---|---|
| 4,576,578 A | | 3/1986 | Parker et al. |
| 5,056,792 A | | 10/1991 | Helweg-Larsen et al. |
| 5,310,349 A | | 5/1994 | Daniels et al. |
| 5,909,589 A | | 6/1999 | Parker et al. |
| 6,038,544 A | * | 3/2000 | Machin et al. ................. 705/11 |
| 6,078,894 A | * | 6/2000 | Clawson et al. ............... 705/11 |
| 6,099,320 A | * | 8/2000 | Papadopoulos ............. 434/322 |
| 6,134,539 A | | 10/2000 | O'Connor et al. |
| 6,149,441 A | * | 11/2000 | Pellegrino et al. .......... 434/350 |
| 6,164,974 A | * | 12/2000 | Carlile et al. ................ 434/322 |
| 6,236,955 B1 | | 5/2001 | Summers |
| 6,315,572 B1 | * | 11/2001 | Owens et al. ................ 434/322 |
| 6,366,759 B1 | * | 4/2002 | Burstein et al. ............. 434/353 |
| 6,418,298 B1 | * | 7/2002 | Sonnenfeld .................. 343/350 |

* cited by examiner

*Primary Examiner*—Teresa Walberg
*Assistant Examiner*—Cameron Saadat
(74) *Attorney, Agent, or Firm*—McCarter & English, LLP

(57) ABSTRACT

The present disclosure relates to a system and method for facilitating personnel education and training, and more particularly to a system and method that allows efficient creation, implementation and utilization of interactive training modules and/or scenarios. The disclosed system and method facilitate creation, implementation and utilization of computer-based simulations by personnel involved in a wide range of educational, professional and/or business pursuits, and include administrative functionalities that greatly enhance system/method efficiency, flexibility and the ease and speed with which educational/training modules and scenarios may be customized and/or implemented.

15 Claims, 21 Drawing Sheets

INTERACTIVE TRAINING SYSTEM AND METHOD

CROSS REFERENCE TO RELATED APPLICATIONS

The present application claims the benefit of a co-pending provisional patent application entitled "Interactive Training System and Method" filed on Jul. 5, 2001, Ser. No. 60/303,275, the contents of which are hereby incorporated by reference.

BACKGROUND

1. Technical Field

The present disclosure relates to a system and method for facilitating education and training of individuals and, more particularly, to a system and method that allows efficient creation, implementation and utilization of interactive training modules and/or scenarios. The disclosed system and method facilitate creation, implementation and utilization of computer-based simulations by personnel involved in a wide range of educational, professional and/or business pursuits, and include administrative functionalities that greatly enhance system/method efficiency, flexibility and the ease and speed with which educational/training modules and scenarios may be customized and/or implemented.

2. Background Art

Significant attention is devoted to education and training of individuals at a variety of stages in their personal and professional development. Educational and training efforts take a multitude of forms, including classic classroom lectures, periodic seminars, reading/review of reference materials, and experiential living. A further form of education and training, namely "distance learning," has been utilized by individuals to extend their education and training, e.g., by way of correspondence courses. With the advent of the Internet and the World Wide Web, a specialized form of distance learning has developed and may be termed "e-learning," i.e., distance learning utilizing a computer network, e.g., the Internet, to access educational and/or training materials.

Beyond providing users with computer-based access to educational and/or training materials, e-learning offers the provider(s) of educational/training materials the ability to make available such educational/training materials to a larger potential audience in an efficient manner. For example, e-learning providers are able to leverage their educational/training content across a spectrum of users/potential users, without incurring substantial incremental cost. Individuals that access the content of an e-learning provider are generally able to do so at their convenience, completing the educational/training regimen at times and over periods consistent with their respective schedules. Moreover, such individuals are able to revisit portions of the coursework, as needed, to ensure understanding and retention.

As used herein, the term "e-learning" is intended to encompass educational/training materials that are remotely accessible to users, e.g., over the Internet or the World Wide Web, as well as educational/training materials that are accessible to or within an organization or entity, e.g., via hosted educational/training module(s) and/or scenario(s) that are available on an intranet network. The advantages associated with e-learning, e.g., broad availability and flexibility in access and use, apply with equal force to hosted educational/training materials, whether accessed via an intranet or the Internet. Students and/or employees may be provided with meaningful opportunities to extend, enhance, refine and/or hone their knowledge, skills and experiences by accessing such hosted educational/training materials over an intranet and/or the Internet.

Development efforts have been invested in improving the quality and delivery of computer-based educational/training products and services. Thus, for example, U.S. Pat. No. 5,909,589 to Parker et al. relates to an Internet-based training system that includes a "habit capture system" that is designed to model a user's characteristics when he/she uses a keyboard, mouse or digitizer. The Parker '589 system queries users as to certain information and captures representative information concerning the user, including keyboard typing patterns, mouse click patterns, and misspelling patterns. The captured information may be compared to characteristics stored in a database related to such user.

U.S. Pat. No. 4,576,578 to Parker et al. describes an interactive training apparatus that constitutes a self-contained mobile unit and includes a program control unit and audio/video program transducing units responsive to program records. Lessons are defined by the program records, and the apparatus includes a fold-out keyboard for limited access by an instructor/operator.

U.S. Pat. No. 5,310,349 to Daniels et al. describes an instructional management system that provides a virtual school user interface that runs on networked personal computers to provide administrative and instructional functions to users in a scholastic environment. Users are able to access desired rooms within a displayed school representation, and the system presents each user as a real-time entity within the virtual school so that interaction with others and with system elements is possible. The Daniels '349 system discloses various functionalities, such as a learning path editor, a guidance tutor, a courseware scheduler and a system monitor.

U.S. Pat. No. 5,056,792 to Helweg-Larsen et al. describes a business education model that allows individuals to simulate running a company. The model permits users to track financial information concerning the simulated company, such as assets, liabilities and the like.

U.S. Pat. No. 6,236,955 to Summers relates to a management training simulation system that is intended to develop decision-making skills in a defined, simulated situation. Multiple users may interact with the simulation system to cause object designs to be injected into the simulation. The Summers '955 training system utilizes a multipeaked value function to process designs throughout the simulation. Users are selectively provided with information about at least some of the objects in the simulation and, based on the users' assessment of such information, revised object designs are sent to the simulation for processing according to the multipeaked value function.

U.S. Pat. No. 6,134,539 to O'Connor et al. describes a goal-based learning system for providing a cognitive educational experience. The O'Connor '539 system provides the user with a simulated environment that presents a business opportunity to understand and solve. The system is adapted to note mistakes and present remedial educational material on a dynamic basis. An artificial intelligence engine is utilized to drive individualized and dynamic feedback synchronized with video and graphics intended to simulate a real-world environment and associated interactions. Multiple "correct" answers are integrated into the O'Connor '539 system to allow individualized learning experiences in which navigation through the system is at a pace controlled by the user. Users are allowed to experience real world consequences associated with their actions/decisions, and a dynamic feedback system provides reports on a user's progress to assist in defining the educational goal. The O'Connor '539 patent disclosure offers a detailed background discussion concerning relevant programming considerations, simulation design considerations, and potential applications for educational/training simulations having general applicability to the subject matter of the present disclosure, and the entire contents of the O'Connor '539 patent are hereby incorporated by reference.

Despite developments to date, a need exists for a system and method for facilitating education and training of individuals and, more particularly, a need exists for a system/method that allows efficient creation, implementation and utilization of interactive training modules and/or scenarios. System(s) and method(s) having utility in a wide range of educational, professional and/or business pursuits are desired. In addition, system(s) and method(s) that include administrative functionalities that offer advantageous levels of efficiency, flexibility and the ease and speed with which educational/training modules and scenarios may be customized, maintained and/or implemented are also needed.

SUMMARY OF THE DISCLOSURE

The present disclosure relates to a system and method for facilitating education and training of individuals and, more particularly, to a system and method that allow efficient creation, implementation and utilization of interactive training modules and/or scenarios. The disclosed system and method facilitate creation, implementation and utilization of computer-based simulations by personnel involved in a wide range of educational, professional and/or business pursuits, and include administrative functionalities that greatly enhance system/method efficiency, flexibility and the ease and speed with which educational/training modules and scenarios may be customized, maintained and/or implemented. The disclosed system and method is particularly advantageous in facilitating the creation, revision and maintenance of educational training modules and scenarios.

According to preferred embodiments of the present disclosure, the disclosed system and method provide administrative users ("administrators") the ability to create realistic, conversational scenarios in an easy, efficient and timely manner. The scenarios may be used for a wide variety of educational/training purposes, including sales training, customer service training, and the like. Indeed, it is contemplated that the disclosed system and method may be utilized to create highly effective educational/training modules and scenarios for use in all evaluative and/or communicative fields, including developing problem solving skills, socialization skills, interviewing skills, negotiating skills, and pre-employment qualification assessment and analysis. Thus, the potential uses and applications of the disclosed method/system are essentially limitless.

Preferred system(s)/method(s) according to the present disclosure provide administrative interface(s) that permit rapid creation of new and/or modified scenarios, and facilitate efficient addition, modification and/or deletion of scenarios (in whole or in part) associated therewith. Administrative interface(s) are typically accessible to individuals who have passed through password protection, as is known in the art, and levels of administrative accessibility are typically created and implemented within an organization to ensure administrative access is limited, as appropriate.

According to preferred embodiments of the present disclosure, users are permitted to interact with respect to the scenarios created, implemented and utilized according to the present disclosure. In preferred embodiments, user access to the scenarios and other disclosed interactive functionalities associated with the present disclosure is restricted by appropriate password protection. Users may provide feedback to system administrators, e.g., through completion of feedback forms, to provide input as to existing scenarios and/or suggestions as to additional scenarios that might be created. Users are generally provided with the ability to search existing scenarios on the system, e.g., by subject matter, product, industry, need, customer, segment, and geography.

The disclosed system is typically hosted on a server, accessed via a computer network, e.g., a WAN, LAN, and/or the Internet, and user interactions are typically achieved through a graphical user interface in a browser-based environment, e.g., using a Netscape Navigator or Microsoft Internet Explorer browser. Scenario(s) created according to the present disclosure may generally be utilized across the computer network, e.g., via the Internet, or downloaded to a user's computer for operation from the user's hard drive. It is further contemplated that scenario(s) created according to the present disclosure may be provided to users on conventional media, e.g., compact disc, floppy disc, or the like, through conventional retail outlets.

Preferred embodiments of the disclosed system/method allow a network-based user to return to an incomplete scenario, e.g., based upon a "cookie" downloaded onto the user's computer, thereby permitting convenient interaction with scenario(s) in a discontinuous manner. In further preferred embodiments of the present disclosure, a database associated with the disclosed system/method collects and stores information/data concerning the interactions of individual users with individual scenarios. Based on the information/data collected in such database, a user may effectively return to a previously visited scenario, e.g., a scenario that was incomplete, and gain the benefit of previous interactions therewith. The database collects log-type information concerning user's interactions with a scenario, whether the user is operating in a network-based or a non-network based manner with the disclosed system/method.

A particularly preferred aspect of the present disclosure relates to the advantageous design and operation of the administrative functions associated with the disclosed system and method. The administrative functionality provided according to the present disclosure allows easy, efficient and rapid creation and implementation of educational/training scenario(s) that meet the needs of individuals in a broad range of personal and professional pursuits. Indeed, the administrative functionalities provided according to the disclosed method/system unlock the significant benefits associated with using simulated scenario(s) to educate and/or train individuals. Such administrative functionality overcomes a key obstacle to widespread adoption of scenario-based educational and/or training methodologies, namely, the significant difficulty associated with creating educational/training scenario(s) that reflect and address the unique aspects of the subject matter of interest in a timely and effective manner.

Thus, in preferred embodiments of the present disclosure, a system and method are provided for creating scenario(s) whereby users may enhance their understanding of relevant information. In an exemplary preferred embodiment, sales scenario(s) may be created that allow sales representatives to gain a better understanding of a company's products and services, and through scenario interactivity, provide such sales representatives with a better understanding as to how to effectively identify and communicate appropriate proposals/solutions to potential customers/third parties based upon relevant information. Scenario(s) created according to the present disclosure may also function as a resource for users seeking guidance in their personal/professional situations and/or function as a training reinforcement tool that may, in the case of sales representatives, help to increase sales revenues and/or margins by establishing a better educated, more selective, direct and indirect sales force. Indeed, the educational/training content associated with exemplary scenario(s) created and implemented according to the present disclosure advantageously enables sales personnel to focus their time and energies on prospects with a greater likelihood of purchasing the relevant products and services.

According to a preferred embodiment of the present disclosure, a system for use in creating an interactive educational module is provided that includes an advantageous administrative interface. The administrative interface preferably includes a plurality of predetermined links for accessing predefined screens for use in inputting information associated with creation of the interactive educational module. At least one of the predetermined links generally provides access to a predefined input screen that is designed and configured to receive a rating for information that is input on the predefined input screen. The rating is generally based on a predefined rating scale, e.g., good, bad, neutral. A verification system may be advantageously provided according to preferred embodiments of the present disclosure, the verification system functioning to check to ensure that the rating for information input on the predefined input screen(s) satisfies predetermined criteria.

According to a further preferred embodiment of the present disclosure, a system for use in creating an interactive educational module is provided that includes an advantageous administrative interface. The administrative interface preferably includes a plurality of predetermined links for accessing predefined screens for use in inputting information associated with creation of the interactive educational module. At least one of the predetermined links generally provides access to a predefined input screen that is designed and configured to receive a rating for information that is input on the predefined input screen. The rating is generally based on a predefined rating scale, e.g., good, bad, neutral. A scoring system may be advantageously provided according to preferred embodiments of the present disclosure, the scoring system utilizing the ratings for the information to derive a performance level for a user of the interactive educational module. Preferred scoring system according to the present disclosure are responsive to attribute(s) of a user of the interactive educational module, e.g., the skill or experience level of the user. Additionally, preferred systems according to the present disclosure may also include a reporting system that generates report(s) reflecting performance levels for users of the interactive educational module.

According to an additional preferred embodiment of the present disclosure, a method for creating an interactive educational module is disclosed that includes: (i) providing an administrative interface that communicates with a processor and a memory unit, the administrative interface providing a plurality of links to access input screens for inputting information associated with creation of an interactive educational module; (ii) selecting from among the plurality of links to access input screen(s); (iii) selecting information for inclusion in the interactive educational module from predefined information displayed on the input screen(s); (iv) inputting additional information on the input screen(s) for inclusion in the interactive educational module; (v) providing rating(s) for the information selected and input on the input screen(s) (the rating(s) being advantageously selected from a predefined rating scale); and (vi) providing a scoring system for establishing a performance level of users of the interactive educational module.

Preferred methods according to the present disclosure may further advantageously include the additional steps of activating the interactive educational module for access by users across a computer network; utilizing the information in the creation of a second interactive educational module; and/or hosting the interactive educational module on a server accessible across a computer network. Preferred methods according to the present disclosure may copy predefined information (in whole or in part) from prior interactive educational module(s) in creating new interactive educational module(s).

Additional features and functions of the disclosed system and method will be apparent from the detailed description which follows.

BRIEF DESCRIPTION OF THE FIGURE(S)

So that those of ordinary skill in the art to which the subject matter of the present disclosure appertains will more readily understand how to construct and use the method/system of the present disclosure, reference may be had to the following figures and the accompanying detailed description, wherein:

FIG. 10 is an exemplary "needs" administrative screen according to an embodiment of the present disclosure;

FIG. 19 is an exemplary "scoring levels" administrative screen according to an embodiment of the present disclosure;

DETAILED DESCRIPTION OF PREFERRED EMBODIMENT(S)

As noted above, the present disclosure relates to a system and method for facilitating education and training of individuals, and more particularly to a system and method that allows efficient creation, implementation and utilization of interactive training modules and/or scenarios. The disclosed system and method facilitate creation, implementation and utilization of computer-based simulations by personnel involved in a wide range of educational, professional and/or business pursuits, and include administrative functionalities that greatly enhance system/method efficiency, flexibility and the ease and speed with which educational/training modules and scenarios may be customized and/or implemented. Scenario(s) and module(s) created according to the present disclosure find utility for a wide variety of educational/training purposes, including sales training and customer service training, and for developing evaluative and/or communicative skills, including problem solving skills, socialization skills, interviewing skills, negotiating skills, and skills associated with pre-employment qualification assessment and analysis.

Figure 1:
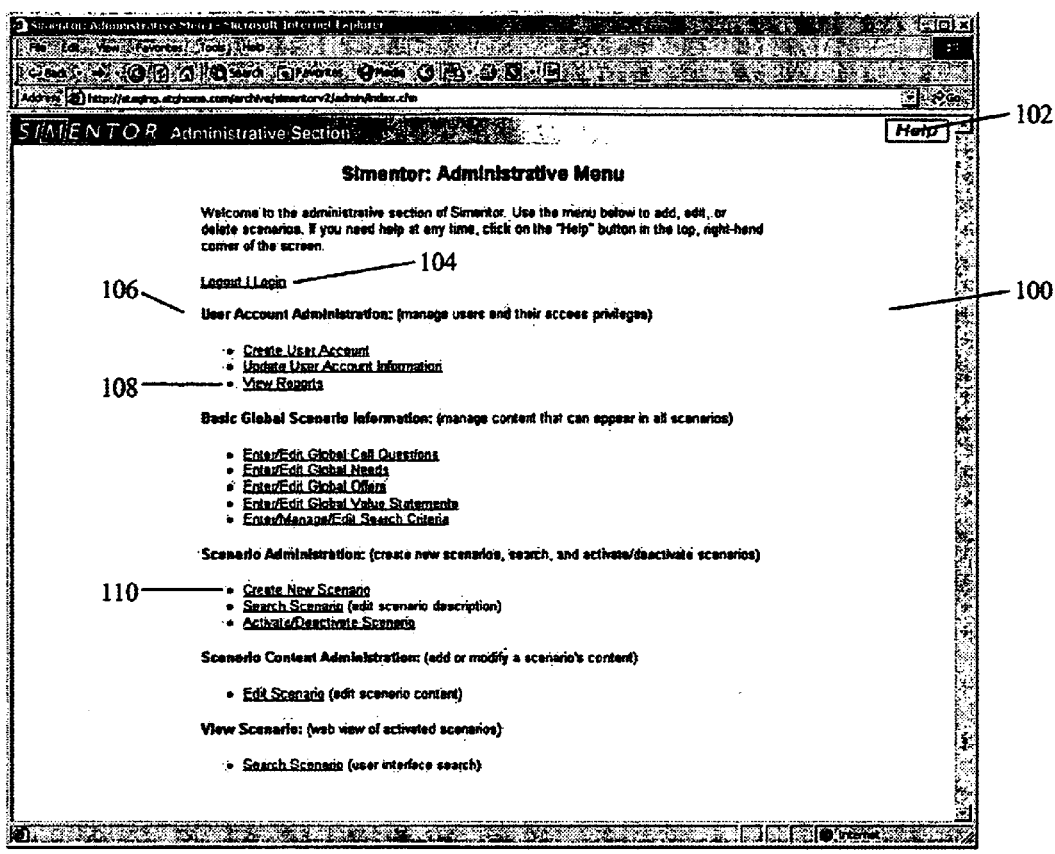
FIG. 1 is an exemplary "administrative menu" screen according to an embodiment of the present disclosure.

With reference to FIG. 1, an exemplary administrative menu screen 100 is depicted according to the present disclosure. The administrative menu is utilized by administrators having appropriate password clearance to create, update and/or maintain scenario(s) according to the present disclosure. Administrative menu screen 100 is typically displayed on an administrator's computer monitor and is delivered to such monitor by a processor associated therewith. The administrator's processor generally functions as a client to a system server, e.g., via a local area network, wide area network, or the Internet. The server includes and/or is in communication with memory unit(s) for storage of programming commands and storage of data. The programming commands include programming to provide the functionalities according to the present disclosure, including the disclosed administrative, user, and reporting interactivities and functionalities. The data storage may utilize conventional memory systems, e.g., RAM, disk storage, tape drive, RAID (s), CD-ROM, and the like, and includes sufficient capacity to support such programming and to store data associated with the disclosed educational/training modules and scenarios. Conventional system hardware and software are utilized according to the present disclosure, such hardware and software being selected and configured to provide and support the disclosed features and functionalities.

Returning to FIG. 1, a "Help" button 102 is provided on the administrative menu to facilitate use thereof by administrators, as is known in the art. Of further note, "Logout/Login" functionality 104 is provided in connection with the administrative menu, as is also known in the art. A password validation engine is typically provided as part of the programming in connection with the disclosed method/system to power all logout/login functionalities described herein, including specifically Logout/Login functionality 104.

With further reference to FIG. 1, exemplary administrative menu screen 100 provides administrators with access to three general areas of activity: User Account Administration, Basic Global Scenario Information, and Scenario Administration. With initial reference to the User Account Administration functionality 106, an administrator is generally provided with the ability to create user accounts, update user accounts, and view reports. In the context of User Account Administration functionality 106, "users" are individuals who are performing administrative functions, e.g., creating, updating, modifying, deleting and/or maintaining scenario (s) according to the present disclosure. Thus, an administrator with appropriate password clearance may access screens for creating additional user accounts, updating existing user accounts (e.g., increasing or decreasing clearance levels), and viewing reports from administrative menu 100.

Figure 2:
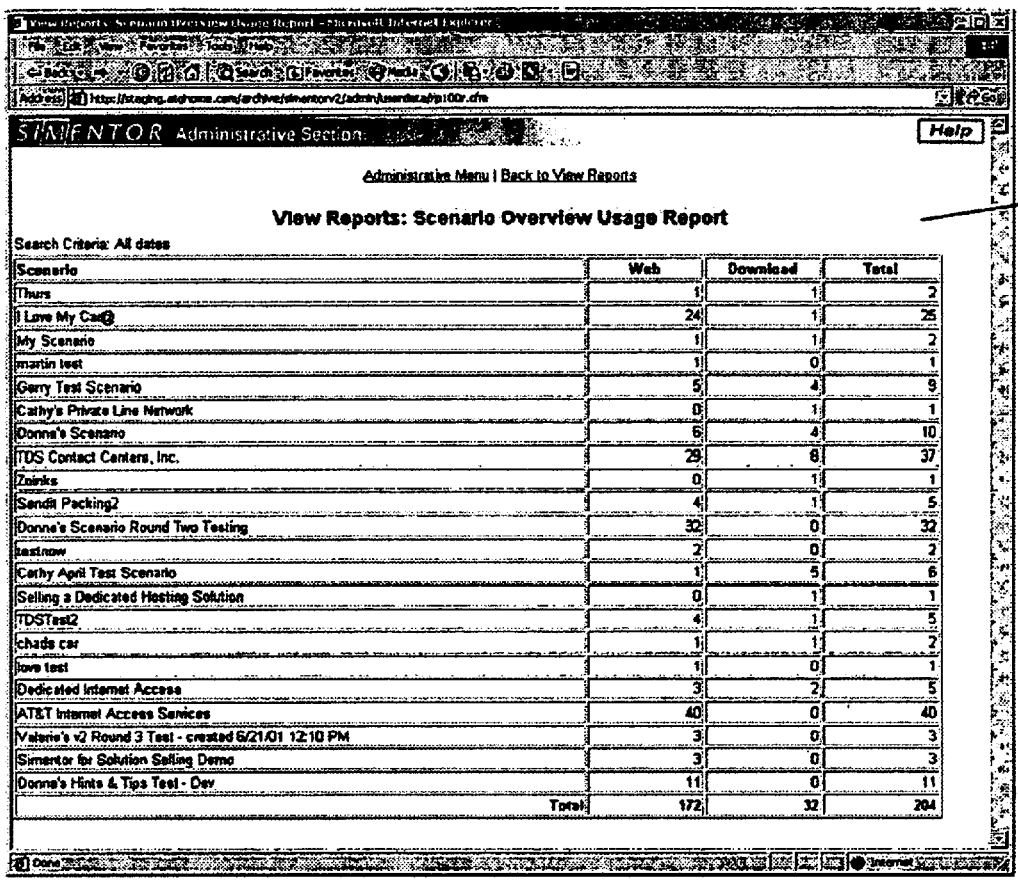
FIG. 2 is an exemplary "view reports" screen according to an embodiment of the present disclosure.

With reference to FIG. 2, an exemplary View Reports screen 150 is depicted according to the present disclosure. The View Reports menu allows an administrator having access thereto to view, evaluate and take responsive action in connection with scenario usage. In the exemplary View Reports screen of FIG. 2, scenario usage is broken down by "Web" usage relative to "Download" usage. Thus, the administrator is able to distinguish between individuals that are accessing specific scenarios across the Internet, i.e., interactively with server(s) hosted by or on behalf of the administrative entity, as contrasted with individuals that are downloading the specific scenarios, e.g., for interaction with the individual's hard drive. The administrator is also able to view the number and titles of active scenarios on his/her system (thirteen scenarios on the exemplary View Reports screen 150). Data for use in generating the usage information reflected in the exemplary View Reports screen 150 of FIG. 2 is generally derived from log files, as is known in the art. The administrative value of the View Reports screen 150, and more particularly the data reflected on View Reports screen 150, will be readily apparent to persons skilled in the art.

In addition to the reports illustrated on View Reports screen 150, the disclosed system/method advantageously permits tracking of user performance across scenarios. Thus, the data generated and collected by the disclosed system/method permit tracking performance reports to be generated on a user and/or scenario basis based on user interactions with scenario(s), e.g., establishing performance levels, time invested, answers provided, decisions made, and the like. Indeed, the performance reporting capabilities of the disclosed system/method are generally effective to satisfy continuing education standards, e.g., reporting standards required by the Aviation Industry CBT Committee ("AICC") and Shareable Courseware Object Reference Model ("SCORM").

Returning to the administrative menu screen 100 of FIG. 1, reference is made to the Basic Global Scenario Information activity region thereon. According to the present disclosure, the creation and implementation of educational/training scenario(s) is greatly facilitated by the pre-population of scenario building blocks, as described herein. According to the exemplary embodiment of the disclosed method/system illustrated with reference to the administrative menu of FIG. 2, the exemplary scenario building blocks relate to the creation and implementation of sales representative training scenario(s). However, as will be apparent from the description which follows, the method and system of the present disclosure are not limited to sales training applications. Rather, the disclosed method and system have broad applicability for developing educational/training scenarios for use in all realms of personal and professional development.

As shown on administrative menu screen 100, five specific functional categories are included within the representative Basic Global Scenario Information category of FIG. 1: Enter/Edit Global Call Questions; Enter/Edit Global Needs; Enter/Edit Global Offers; Enter/Edit Value Statements; and Enter/Manage/Edit Search Criteria. Consistent with an administrator's role in creating, modifying and managing scenario(s) according to the present disclosure, each of the foregoing categories provides the administrator with the ability to enter/edit global aspects of the scenario-building functionality enabled according to the disclosed method/system.

Figure 3:
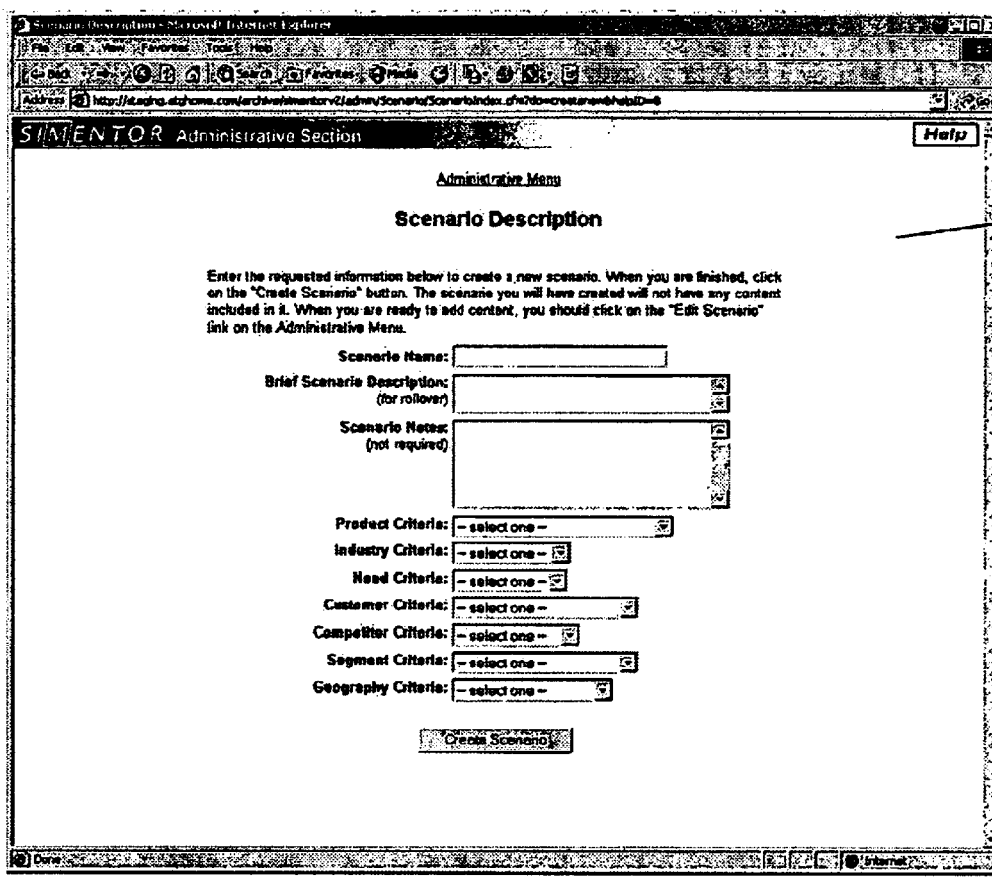
FIG. 3 is an exemplary "scenario description" screen according to an embodiment of the present disclosure.

To create a new scenario according to the disclosed method/system, an administrator typically accesses an initial menu screen to provide/input basic information concerning the new scenario. With further reference to exemplary administrative menu 100 of FIG. 1, an administrator with appropriate password clearance may select the "Create New Scenario" link 110 from administrative menu 100 and commence creation of a new scenario. FIG. 3 provides an exemplary initial menu screen for use in creating a new scenario, such exemplary screen being entitled Scenario Description screen 170. The Scenario Description Screen 170 is used by an administrator in providing/inputting general information concerning a new scenario. Scenario Description screen 170 allows an administrator to input basic information, such as the new scenario's name, brief scenario description and scenario notes. In addition, according to preferred embodiments of the present disclosure, scenarios are classified, grouped and/or indexed according to predetermined categories and/or descriptors. Thus, exemplary Scenario Description screen 170 includes a series of "criteria" for use in classifying, categorizing and/or describing a new scenario, including product, industry, need, customer, competitor, segment and geography criteria. Each such criteria is generally selected from a drop-down menu based on predetermined choices pre-stored in the memory units associated with the disclosed system. Additional criteria may be added (or criteria deleted) based on the desires and/or experiences of individuals involved in using and/or administering the disclosed method/system. It is further contemplated that additional choices may be added (or unnecessary choices deleted) from the drop-down menus for individual criteria based on the desires and/or experiences of system/method users and/or administrators.

Once an administrator has completed his/her input of data using Scenario Description screen 170, the administrator clicks on the Create Scenario button at the lower left of screen 170. The information input to Scenario Description screen 170 is stored to a memory unit associated with the disclosed system/method, but the scenario does not yet contain any content. Rather, completion of exemplary Scenario Description screen 170 by an administrator serves to identify, categorize and index a new scenario prior to its creation.

Having commenced creation of a new scenario by completing Scenario Description screen 170, an administrator may advantageously commence supplying such new scenario with content. The order in which the administrator supplies the new scenario with content is not critical. However, as described in greater detail hereinbelow, a failure on the part of the administrator to satisfy certain criteria in connection with supplying content to a new scenario will prevent activation of the scenario. In other words, the disclosed system and method includes advantageous feedback functionality to ensure the scenario(s) satisfy certain predetermined requirements, e.g., input of a manager e-mail message, "files," "questions" for the customer call, "needs," "solutions," "hints and tips," and the like.

According to exemplary sales training modules according to the present disclosure, a manager's e-mail is generally input to the system for future access/viewing by a scenario user. Thus, for example, the hypothetical manager e-mail may inform the user/sales representative that a new sales lead has been identified in his/her territory and provide initial information for consideration by the user/sales representative in moving forward with the sales lead. Of note, the disclosed method/system generally provides a variety of template functionalities to assist administrators in creating and implementing scenarios and, in preferred embodiments hereof, template manager's e-mail messages may be provided to assist administrators in the creative process. In both sales training and non-sales training applications of the system/method of the present disclosure, alternative hypothetical communications may be used to commence/initiate a scenario, as will be apparent to persons skilled in the art from the description herein.

Figure 4:
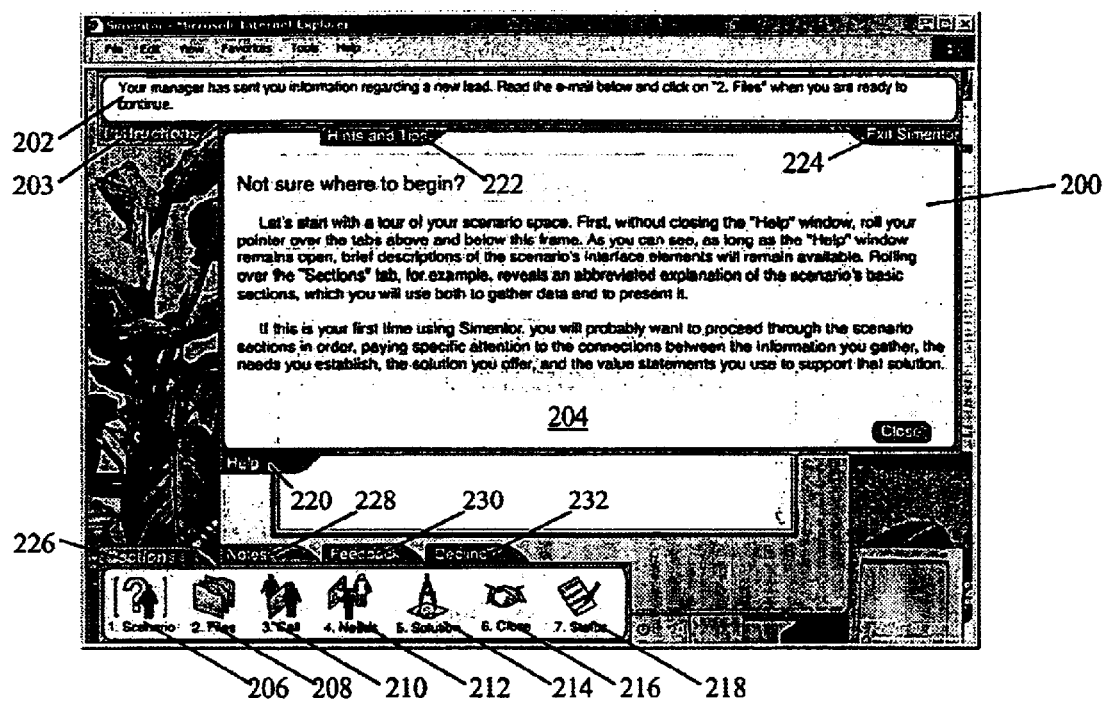
FIG. 4 is an exemplary "start" screen for a scenario according to an embodiment of the present disclosure.

In addition to an initiating communication, e.g., a manager's e-mail message, the creation of a scenario according to the present disclosure requires additional content. To better understand the utility of and advantages associated with the administrative functions, particularly as they relate to creation of a new scenario, and to illustrate the significant benefits associated with educational/training modules and scenarios created and implemented according to the present disclosure, an exemplary educational/training scenario according to the present disclosure is described herein. With reference to FIG. 4, an exemplary "Start" screen 200 is depicted for a sales representative training scenario according to the present disclosure. The exemplary scenario is designed to provide a sales representative, i.e., the user of the scenario, with an opportunity to develop an understanding of the needs of a potential customer, and based on the sales representative's understanding, to formulate a proposal for consideration by the potential customer. The products/services upon which the sales representative's proposal will be based generally correspond to the products/services offered by the sales representative's employer or supplier, e.g., in the case of a distribution arrangement. Thus, the exemplary scenario described herein has broad applicability to sales organizations that are involving in promoting, marketing and selling products and services of all types.

The exemplary scenario of FIG. 4 begins with an introductory message advising the sales representative that his hypothetical supervisor has forwarded an e-mail regarding a new sales lead. Such introductory information is contained within a box 202 labeled "Instructions" at the top of Start screen 200. The introductory information generally automatically appears in box 202 upon arriving at Start screen 200, i.e., no affirmative action is required by the user/sales representative to access the introductory information. In addition, an orientational help message is contained within a central box 204 located at the center of Start screen 200. The orientational message generally appears in the central box 204 in response to the user clicking on the Help button 220, which was initially positioned along the upper border of Start screen 200. The help message invites the user to "tour" various functionalities associated with the interface associated with the exemplary scenario according to the present disclosure. Of note, key navigational buttons associated with the illustrated scenario are located in the bottom left of Start screen 200, and will generally remain in the same physical location on the user's screen throughout operation and viewing of the scenario.

Seven key navigational buttons are provided on Start screen 200: Scenario button 206, Files button 208, Call button 210, Needs button 212, Solution button 214, Close button 216, and Status button 218. The functions associated with these navigational buttons will become apparent from the description which follows. However, in general, the navigational buttons reflect a suggested sequence of steps for the user/sales representative to follow in advancing through the scenario. A user need not follow the suggested sequence according to preferred scenario(s), however. Rather, the user is generally able to experience the scenario in a sequence of his/her choosing.

Additional control buttons appear on Start screen, including an Instructions button 203, a Hints and Tips button 222, an Exit Scenario button 224, a Sections button 226, a Notes button 228, a Feedback button 230, and a Decline button 232. The functionalities of each of these additional buttons, i.e., other than the seven key navigational buttons, will be briefly described.

Instructions button 203 provides the user/sales representative with access to instructional message(s) associated with individual screens within a scenario.

Hints and Tips button 222 provides information to the user/sales representative to assist in completing the scenario, e.g., navigational guidance. The information may be specific to the screen being viewed by the user, may be specific to the scenario being experienced by the user, and/or may provide general navigational insights.

Exit Scenario button 224 permits a user/sales representative to discontinue use of the scenario. Of note, the disclosed system/method advantageously includes functionality to ensure that the user/sales representative will be able to return to the scenario stage he had previously reached, upon returning to the scenario, e.g., through "cookie" technology.

Sections button 226 permits a user/sales representative to view the seven available stages (and associated buttons) for completion of the scenario (Scenario, Files, Call, Needs, Solution, Close and Status).

Notes button 228 permits a user/sales representative to access a notepad for recording notes for future reference during the scenario.

Feedback button 230 permits a user/sales representative to submit feedback concerning the scenario and/or interface, thereby allowing the administrative team to gain insights as to the users' impressions of the scenario experience.

Decline button 232 permits a user/sales representative to indicate that he/she does not believe the sales lead is likely to lead to a successful sales outcome. According to preferred embodiments, selection of the Decline button 232 may result in "consultative interaction" with the user's hypothetical manager to "discuss" the user's determination that an unsuccessful sales outcome is likely. In certain circumstances and/or at certain points in the user's progress through the scenario, the disclosed system/method may require the user to reconsider his/her preliminary judgment (i.e., by way of the consultative interaction), whereas in other cases a user's judgment that an unsuccessful outcome is likely may be the "correct" outcome, establishing successful completion of the scenario by the user/sales representative.

An experienced user of the disclosed system/method may be fully familiar with the functionalities of the various buttons/links available on Start screen 200, and may therefore quickly bypass the Help information or simply choose not to utilize Help button 220. However, new functionalities may be added, or previous functionalities may be revised/substituted, from time to time. Accordingly, it is generally desirable according to the disclosed system/method to commence each scenario at Start screen 200. However, as noted previously, a user/sales representative who has previously commenced, but not completed, a scenario may advantageously return to the stage at which participation was previously discontinued, thereby bypassing the Start screen 200 upon his/her return.

To initiate participation in a scenario, the user generally clicks on Scenario button 206 to access the manager e-mail referenced in the instructional message set forth on Start screen 200. Of note, substantially hidden behind box 204 on FIG. 4 is an exemplary e-mail message from a manager that functions to initiate the user's interaction with the scenario. The manager's e-mail message typically provides the user/sales representative with information concerning the sales lead, e.g., the name, title and/or contact information for an individual associated with the sales lead, background information as to the source of the lead, guidance as to timeframe and potential products/services of interest, pricing parameters, words of encouragement, and the like. Of note, the style and tone of the manager's e-mail message may be varied by the administrator(s) involved in creating and implementing the scenario to convey and/or reflect different managerial approaches, thereby enhancing the educational/training value of scenarios according to the present disclosure.

Returning to the exemplary scenario associated with the manager's e-mail message referenced on Start screen 200 of FIG. 4, the user/sales representative typically gains a broad outline of the sales lead opportunity from a review of the manager's e-mail. To the extent the user/sales representative has immediate thoughts with respect to such sales lead, the user/sales representative may record such thoughts within the disclosed method/system by clicking Notes button 228, as discussed hereinabove. Having reviewed the manager's e-mail message, the user/sales representative generally proceeds to a further step in the scenario process. A next potential step in the scenario process is generally associated with the Files button 208, although the user/sales representative is free to bypass Files button 208, e.g., by immediately clicking Call button 210 if he/she feels such action to be the next appropriate step. Indeed, the user/sales representative is free to select and/or skip any aspect of the scenario at any time, without affecting the overall operation and functionalities of the disclosed scenario(s). However, a user/sales representative may negatively impact his/her performance in a scenario by skipping aspect(s) thereof, e.g., based on the scoring protocol (described below) associated with the scenario. In addition, as noted previously, the user/sales representative may select Decline button 232, e.g., if he/she believes that the sales lead is directed to goods/services not available from the user/sales representative. Thus, the disclosed method/system offers the user/sales representative with significant flexibility in his/her approach to experiencing/interacting with the disclosed scenario(s).

Figure 5:
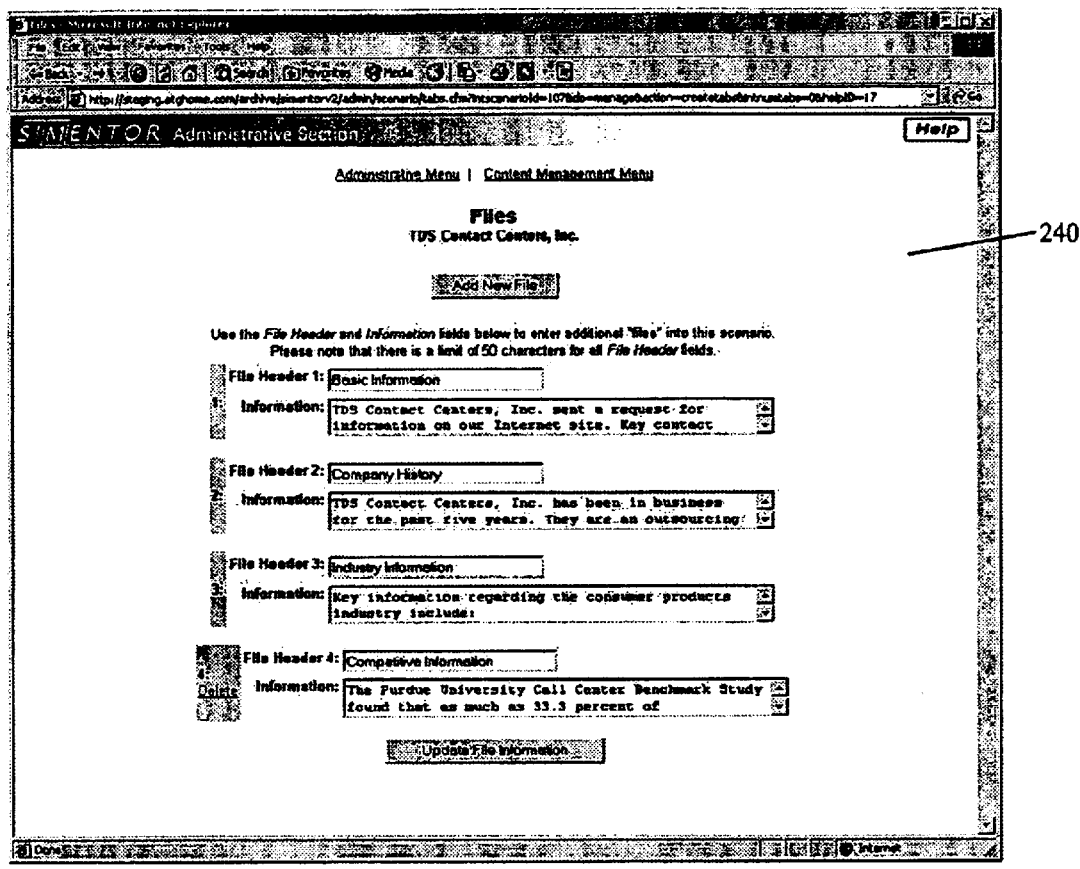
FIG. 5 is an exemplary "files" administrative screen according to an embodiment of the present disclosure.

In creating a scenario, an administrator is required to provide/create files for potential review by a user/sales representative in connection with the scenario. With reference to FIG. 5, an exemplary "files" administrative screen 240 is depicted for use by an administrator in creating the files for a new scenario. As shown in files administrative screen 240, a series of input blocks for "file headers" and "information" are provided for use by the administrator. While the exemplary files administrative screen 240 supplies input blocks for four files, additional files may be created by using the "Add New File" button at the center of screen 240. The files created by the administrator using files administrative screen 240 typically provide useful background information concerning or related to the sales lead that was the subject of the manager's e-mail message. Thus, for example, basic information concerning the sales lead's company history, the sales lead's industry, and the sales lead's competitive position may be provided in individual files for potential access and review by the user/sales representative.

In creating scenario(s) according to the present disclosure, the administrator may create as many "files" as are deemed appropriate to such scenario(s), subject to a potential requirement that a predetermined minimum number of files be created. Template "files" are advantageously provided for use/modification by administrative personnel, and "files" used in prior scenario(s) may be easily repurposed for use in newly created scenario(s) with ease. Although decisions as to the nature, quantity and content of files available to users/sales representatives is subject to administrative prerogative, preferred scenarios include a blend of relevant and substantially irrelevant information within such files, thereby effectively simulating a user's need to filter available information to discern that information that is useful in achieving a specific purpose or objective. The files may also contain potentially misleading information to further test/challenge the user/sales representative in his/her assessment of the available information. Moreover, preferred methods/systems according to the present disclosure generally establish a minimum number of files for implementation of a scenario, e.g., at least three files. A maximum number of files may also be established, e.g., nine files, to ensure that the scenario remains manageable. If administrative personnel fails to create/establish the requisite number of files, the system/method preferably apprises the administrator of the need for additional file(s) and prevents implementation/activation of the scenario until the shortcoming is addressed. When the administrator has completed his/her creation of relevant files, the "Update File Information" button at the bottom of files administrative screen 240 is clicked to submit the information to a memory unit associated with the disclosed system/method.

Figure 6:
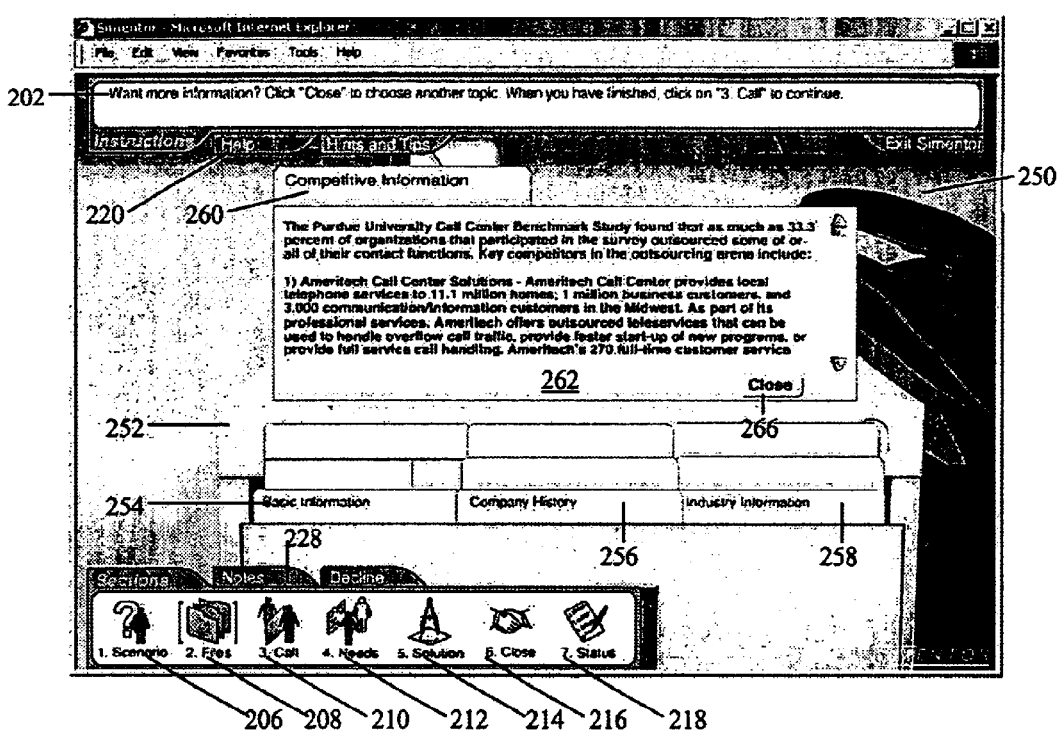
FIG. 6 is an exemplary "files" screen for a scenario according to an embodiment of the present disclosure.

Leaving the administrative functionality of the disclosed system/method and returning to the exemplary scenario of FIG. 4, an exemplary Files screen 250 is depicted in FIG. 6, such Files screen 250 being accessible to the user/sales representative by clicking Files button 208. Of note, preferred embodiments of the present disclosure provide contextual graphics in connection with the narrative information provided to the user at various stages of scenarios. Thus, with reference to FIG. 4, the manager's e-mail message (substantially hidden by the box 204) appears graphically on an image of the user's computer monitor, with office plants to the left and a CPU to the right. Similarly, with reference to FIG. 6, Files screen 250 features a graphical representation of a partially open file cabinet 252 having a series of files positioned therein. Each of the labeled files is accessible to the user/sales representative for reference purposes in connection with the scenario.

Files screen 250 includes instructional information related to the user's potential use of the available files, and suggested next steps once the user's file review is complete, in box 202. Thus, with further reference to FIG. 6, Files screen 250 provides the user/sales representative with access to four illustrative files: Basic Information file 254, Company History file 256, Industry Information file 258 and Competitive Information file 260. These files correspond to the four illustrative files created on the files administrative screen 240 of FIG. 5. Of course, the titles and contents of such files may vary, based on the administrator's judgment as to appropriate background information for potential review/reference by a user/sales representative.

As shown on FIG. 6, the user/sales representative has elected to review the competitive information contained in the Competitive Information file 260 by clicking on such file. The contents of the Competitive Information file appears in central pop-up box 262 and includes a navigation bar 264 at its right side as well as a Close button 266 for use in returning the file to file cabinet 252 upon completion of the user's review. The Files screen 250 may be revisited by the user/sales representative at any stage in his/her interaction with the disclosed scenario, e.g., to revisit or review basic information contained within the Basic Information file 254, by clicking on the Files button 208. Again, based on review of available file information, the user/sales representative may input notes for future reference by selecting Notes button 228, as discussed above.

Figure 7:
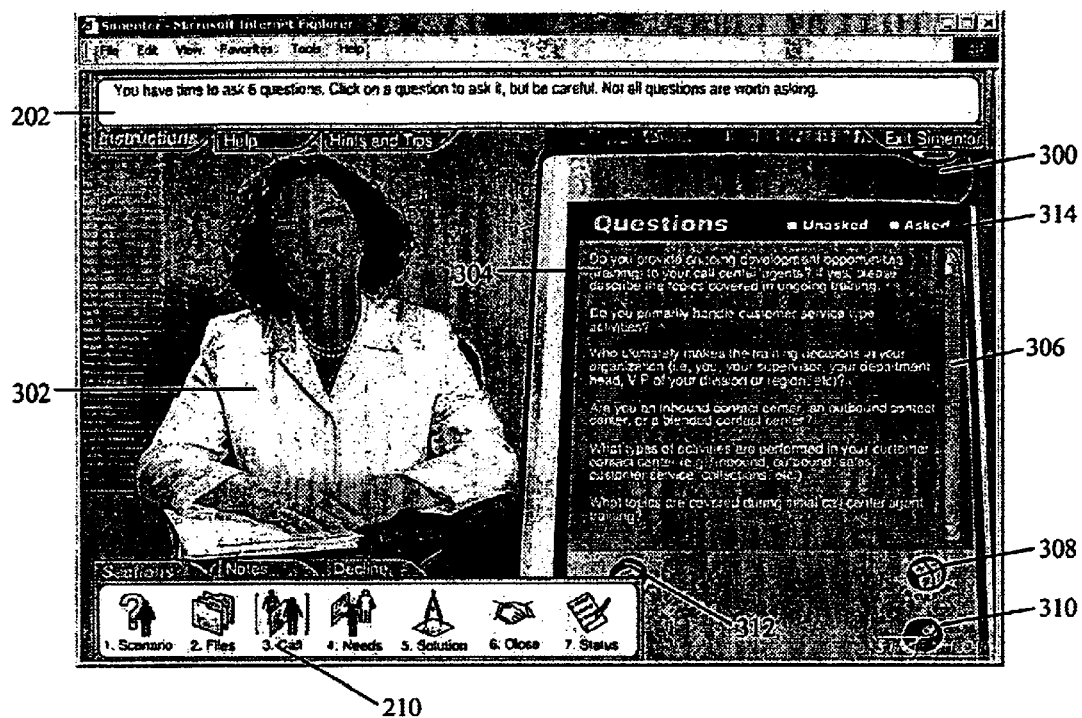
FIG. 7 is an exemplary "call" screen for a scenario according to an embodiment of the present disclosure.

Turning to a further stage in the illustrated scenario, the user/sales representative is provided with an opportunity to "call" upon the sales lead by clicking on Call button 210. Box 202 provides the user/sales representative with instructional information concerning the parameters for the sales call. In the exemplary scenario illustrated by Call screen 300 in FIG. 7, the user/sales representative will be permitted to ask the sales lead a total of six questions. The parameters for sales calls according to the present disclosure are generally within the control of the administrative personnel creating scenario(s), and the six questions permitted according to the illustrated embodiment merely exemplifies the imposition of certain restraints on the user/sales representative in interacting with the sales lead. Such restraints/parameters are valuable in simulating the realities of most sales calls, where the time and attention of the sales lead to a sales representative's inquiries are typically limited.

Moreover, preferred systems/methods according to the present disclosure are designed to adapt and/or adjust to the level of the user/sales representative, providing more challenging scenarios and scenario parameters to individuals of greater skill and/or experience. Thus, it is contemplated that a user may establish his/her skill level upon registration, e.g., beginner, intermediate or advanced (Level I, II or III). It is further contemplated that a user's prior performance with respect to scenarios according to the present disclosure may influence/determine a user's skill level for purposes of the disclosed system/method. In either case, more stringent scenario guidelines are contemplated for more advanced users.

With further reference to Call screen 300, a graphical image of an individual 302 representing the sales lead is provided at the left side thereof. In the exemplary embodiment of FIG. 7, individual 302 is shown seated at her desk, appearing attentive and receptive to the user's inquiries/communications. Alternative graphical images and/or settings are contemplated and may be utilized by administrative personnel in creating scenario(s) according to the present disclosure, e.g., individuals of differing ages, genders, dispositions may be employed, as well as different communication settings, e.g., social function, meeting, travel setting, and the like. In preferred embodiments of the present disclosure, a menu of images/settings is provided for use by administrative personnel in creating new scenario(s). It is further contemplated that users of the scenarios created according to the present disclosure may advantageously select from among available individuals and settings, thereby varying the nature of the scenario as may be desired by such user.

In Question box 304, a series of potential questions to be posed by the user/sales representative to the sales lead are displayed. A navigation bar 306 is provided at the right side of Question box 304 to enable the user/sales representative to survey available questions before commencing his/her discussion with the sales lead. According to an illustrative embodiment of the present disclosure, the visual imagery for Call screen 300 features a PDA image containing Question box 304. As such, additional functionality associated with a PDA may be provided in connection with a preferred embodiment of Question box 304, e.g., a calculator 308, search functionality 310, and review functionality 312. A user/sales representative may find such additional functionality useful in conducting the sales lead discussion, e.g., the calculator function may be necessary/desirable to calculate margins, commissions or the like.

With reference to the instructional message contained in box 202 on Call screen 300, the user/sales representative is advised that he/she may ask a question of the sales lead by clicking on the question within Question box 304. Of note, Question box 304 includes indicia 314 to inform the user/sales representative whether a specific question has previously been asked/not asked. Such functionality may be particularly useful for users that return to complete a scenario after the passage of time, e.g., if interrupted and unable to complete the scenario in a single session.

According to the present disclosure, the selection of appropriate questions for consideration by a sales lead is believed to be of substantial importance to assessing the viability of a sales lead, establishing rapport with a sales lead, and formulating an appropriate offer/proposal for consideration by the sales lead. Some questions are likely to lead to useful information whereas other questions are likely to generate nothing of value. Moreover, sales leads are likely to react negatively to questions that reflect a lack of preparation on the part of the sales representative. Thus, in the context of sales training, strategic use of available time for questioning a sales lead is of paramount importance to developing effective sales skills and, concomitantly, to successfully completing scenario(s) according to the disclosed system/method.

Returning to the administrative menu screen 100 of FIG. 1, an administrator is provided with significant flexibility in developing appropriate questions for inclusion in a scenario according to the present disclosure. However, notwithstanding the significant flexibility afforded the administrator, the disclosed method/system also provides administrative personnel with highly advantageous resources in developing questions for inclusion in scenario(s). Thus, with reference to the Basic Global Scenario Information, a series of "Global Call Questions" are generally provided for reference by administrators in formulating new scenario(s) and/or editing existing scenario(s). Administrative personnel with appropriate password clearance are able to access the "Enter/Edit Global Call Questions" functionality from administrative menu 100. Similarly, administrative personnel with appropriate password clearance are able to develop additional questions unique to a particular scenario in creating a new scenario.

Figure 8:
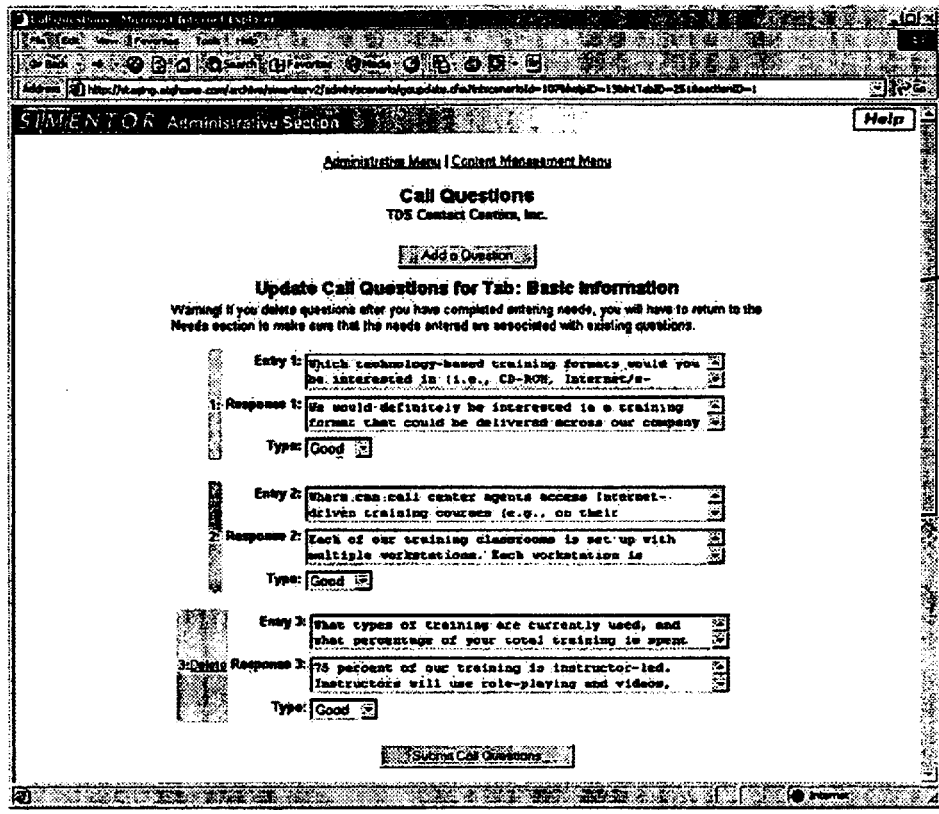
FIG. 8 is an exemplary "call questions" administrative screen according to an embodiment of the present disclosure.

Turning to FIG. 8, an exemplary Call Questions administrative screen 350 is depicted for use by an administrator in developing and assigning "type" to potential call questions. As set forth on screen 350, input blocks are provided for questions to be posed by users/sales representatives ("Entry") and answers to be given in response thereto by the sales lead ("Response"). Thus, for each question, an answer is provided that reflects the sales lead's response should the user/sales representative elect to pose such question. The questions may range from specific to general, and may or may not be aimed at developing information pertinent to the products/services offered by the user/sales representative. Some of the questions may advantageously build on information contained in the files created by the administrator.

As a further aspect of question creation, the administrator generally assigns a "type" to each question/response combination. In the exemplary embodiment of FIG. 8, the available "types" for use by the administrator are: good, neutral and bad. Alternative "types" or "ratings" are contemplated, e.g., numeric ratings and more highly gradated ratings (e.g., excellent, very good, good, fair, neutral, bad, very bad). The types/ratings are intended to reflect the quality of the question in eliciting information of value to the user/sales representative in connection with the scenario, and form at least in part the basis for assessing a user's performance with respect to a scenario. The rankings/valuations of questions may also be used to guide future follow-up actions with respect to a user/sales representative.

Thus, in a preferred embodiment of the present disclosure wherein a three-level rating system is employed (good, neutral, bad), questions that are irrelevant or reflect lack of preparation are generally rated "bad" questions, e.g., "Do you enjoy your job?' Questions that are non-productive, yet not irrelevant or indicative of poor preparation, are generally rated "neutral" questions, e.g., "I read that you have 5locations, 4 in the U.S. and one in Asia. Is that correct?" And questions that are productive and likely to lead to valuable insights/information are generally rated "good" questions, e.g., "With five locations, how do you ensure consistent training so that high-quality customer service is provided to all of your customers?"

In developing questions for a new scenario, an administrator may augment his/her scenario-specific questions/answers by drawing upon pre-existing "global" and/or "standard" questions that are stored within memory unit(s) associated with the present disclosure. Such global/standard questions are advantageously available for inspection/review, e.g., by way of a tabular screen presentation or the like. In preferred embodiments of the present disclosure, a series of global and/or standard questions are established to facilitate future scenario creation. Conversely, scenario-specific question(s) developed by an administrator may be established as a "global" question for subsequent access by future administrators, e.g., by translating, transferring and/or reentering such scenario-specific question as a global question within the associated database.

In creating a new scenario, one or more "global" and/or "standard" questions may be associated with scenario-specific answers by the administrator. The association of global/standard questions with scenario-specific answers is generally effectuated through appropriate coding that points a global question to a scenario-specific answer within a relational database, based on the scenario name/identification. Thus, a global question is generally "copied" into individual scenario(s), as desired by the administrative personnel responsible for creating the scenario, and the scenario-specific answer is associated therewith within the system's database. Such database management/design is effective in versioning control and in facilitating utilization of individual scenario(s) when downloaded by users.

According to preferred embodiments of the present disclosure, the questions displayed in Question box 304 are directly influenced by/dependent upon the preparation undertaken by the user/sales representative before commencing his/her call upon the sales lead. For example, scenario-specific question(s) that would not be apparent to users/sales representatives in the absence of his/her review of a particular file in file cabinet 252 are not displayed in Question box 304. Thus, according to preferred embodiments of the present disclosure, users/sales representatives that bypass File screen 250 and/or fail to review any of the files contained in file cabinet 252 will generally be limited to "global" and/or "standard" questions in Question box 304. For each file reviewed by the user/sales representative, therefore, scenario-specific questions that derive in whole or in part from the information contained in such file will typically be included in Question box 304.

In addition, as noted on Call Questions administrative screen 350, the questions developed and/or selected by an administrator correlate with the "needs" aspect of the exemplary scenario described herein. In particular, a specific question may elicit information that highlights a "need" of the hypothetical sales lead. However, the failure to make such question available to the user/sales representative, e.g., if the question is deleted from the scenario, prevents the user/sales representative from identifying such need as part of the scenario. In such case, it would be inappropriate to retain a hidden need as a choice in the "needs" portion of the scenario (discussed below), and the disclosed system/method advantageously alerts the administrator to the interrelated nature of the question/need so as to prevent an undesirable disconnect between the questions and the needs portions of the scenario.

Of note, in preferred embodiments of the present disclosure, the graphical image of individual 302 provides a visual message as to the sales lead's reaction to questions posed by the user/sales representative. Thus, a question that is deemed to-the-point by the sales lead generally results in a warm reaction from individual 302, whereas an irrelevant or non-researched question generally results in an icy response from individual, as reflected in the graphical image of individual 302 displayed on Call screen 302 as the "answer" appears in box 304. As with the scenario-specific answers discussed above, code to generate the desired visual message is typically contained within a relational database and is associated with the question/answer combination that is to give rise to such visual message. The same visual message may be associated with multiple question/answer combinations, thereby improving the efficiency and simplicity of the system, as will be apparent to persons skilled in the art.

Figure 9:
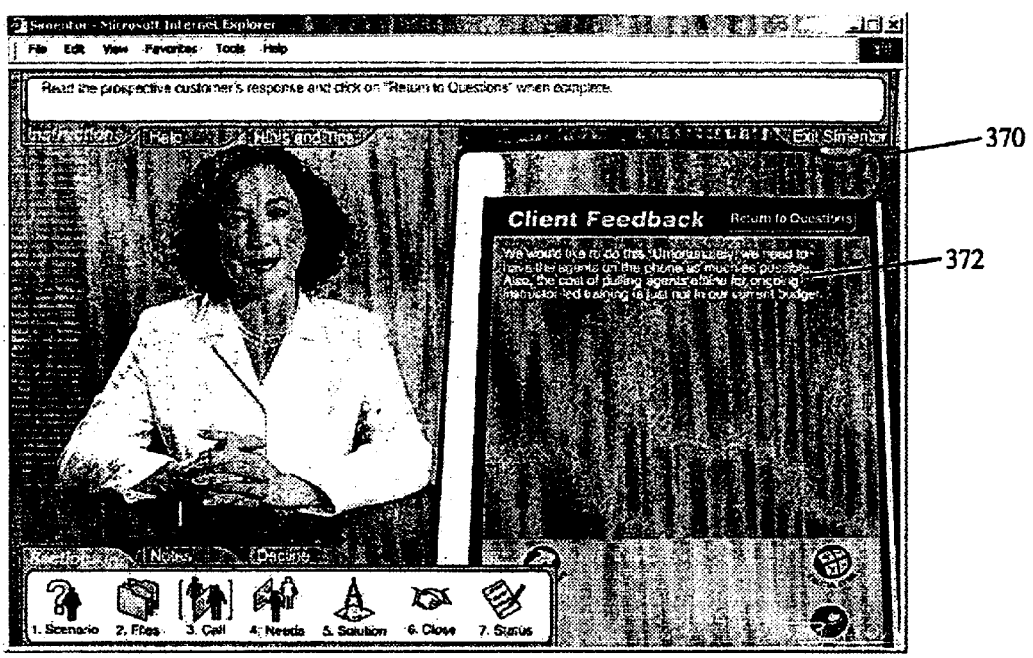
FIG. 9 is an exemplary "client feedback" screen for a scenario according to an embodiment of the present disclosure.

Turning to FIG. 9, an exemplary Client Feedback screen 370 is shown wherein a sales lead is responding favorably to a question selected by the user/sales representative. The "client feedback" depicted in box 372 reflects the "response" provided by the administrator with respect to the corresponding question in providing input to Call Questions administrative screen 350. Although the user is not directly informed as to whether the question was good/neutral/bad, the response from the sales lead is clearly positive, both in words and in the visual messaging provided in the graphical representation of the sales lead. Thus, the user/sales representative receives immediate positive feedback as to the question selection, while the system/method of the present disclosure notes the fact that the user/sales representative has selected a "good" question.

Figure 10:
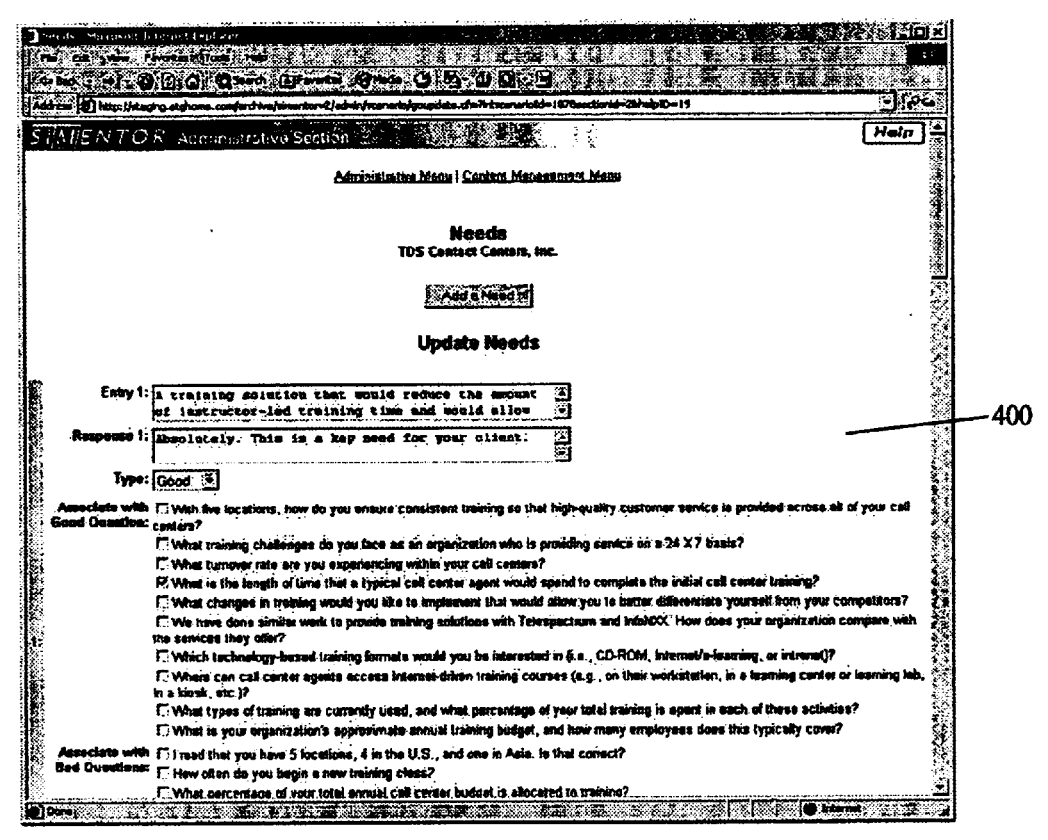
Figure 11:
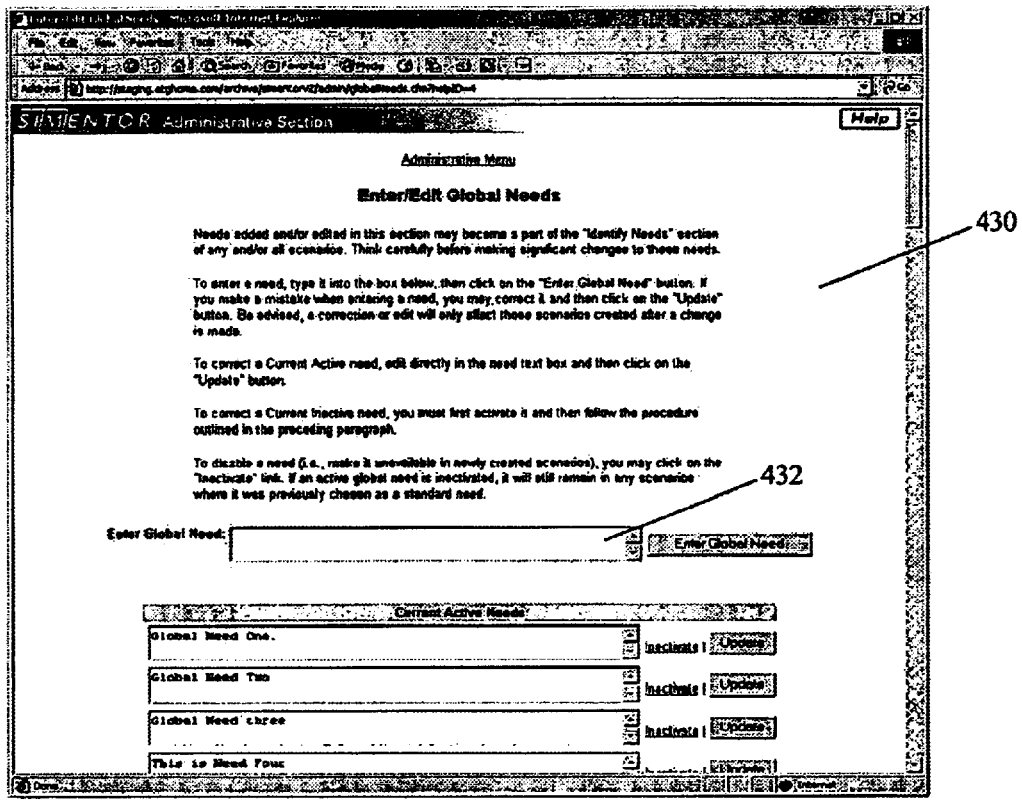
FIG. 11 is an exemplary "enter/edit global needs" administrative screen according to an embodiment of the present disclosure.

With reference to FIGS. 10 and 11, exemplary screen shots associated with two preferred functionalities for establishing "needs" in connection with a scenario according to the present disclosure are illustrated. In FIG. 10, a "Needs" administrative screen 400 is depicted that permits an administrator to input a potential need for a sales lead ("Entry") and an associated reply from the sales lead ("Response"). As with the questions/responses discussed hereinabove, an administrator rates each "need" according to a predetermined scale, e.g., good, neutral, bad, in a box labeled "Type." Thus, for each "need" made available to a user/sales representative in connection with a scenario, a corresponding response and a rating are provided by the administrator. Of further note, the administrator's rating of the "need" triggers the system to list the correspondingly rated questions therebelow.

In the exemplary depiction of FIG. 10, the "need" was rated "good" and, therefore, each of the "good" questions entered by the administrator are listed therebelow. The administrator selects the question(s) that correspond to the need, by placing a check in the associated box. At least one question must be correlated with each need created by the administrator. Thus, the questions can be useful to an administrator in establishing potential needs for inclusion in the needs portion of the scenario. When a question is associated with a need, the disclosed system/method automatically makes the "need" available for selection by the user/sales representative based on the question being posed to the sales lead by the user/sales representative. Conversely, "needs" that are associated only with questions that are not asked by the user/sales representative are not available for selection by the user/sales representative at the needs stage of the scenario. It is contemplated that a need may be associated with multiple questions, and that a question may be associated with multiple needs, depending on the interrelated nature of the subject matters thereof.

Turning to FIG. 11, an exemplary "Enter/Edit Global Needs" administrative screen 430 is provided. According to the present disclosure, global needs are useful in rounding out the list of needs from which a user/sales representative will select in developing a solution for the hypothetical sales lead. Because a global need is generally not geared to or relevant to a specific need of a sales lead, global needs are generally "neutral" or "bad" selections for purposes of a scenario. As shown in administrative screen 430, an administrator is generally provided with the ability to enter new/revised global needs in input box 432, and/or to select from pre-existing global needs from a menu of "current active needs." Once a global need is selected, the administrator creates a scenario-specific response to such global need and assigns a value thereto, e.g., based on input boxes comparable to those shown in FIG. 10.

The disclosed system/method generally establishes a minimum number of needs for implementation of a scenario. Thus, according to preferred embodiments of the present disclosure, a minimum number of four "needs" must be supplied by the administrator in establishing a new scenario. Of the four "needs," the disclosed system/method further generally requires that at least one "need" be a good selection, one "need" be a bad selection, and two "needs" be merely additional or neutral. Alternative threshold levels and different proportions among such needs are contemplated and will vary on such factors as the complexity of the scenario and skill/experience level of users.

Figure 12:
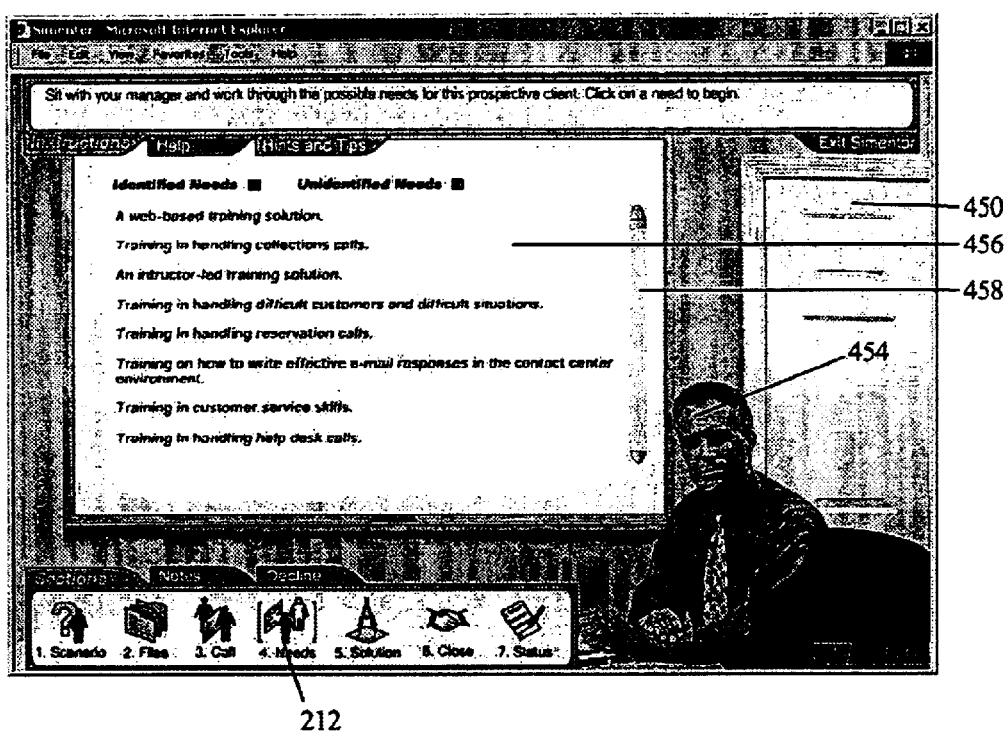
FIG. 12 is an exemplary "sales manager meeting" screen for a scenario according to an embodiment of the present disclosure.

Returning to the exemplary sales representative training scenario that was initiated by a manager e-mail in FIG. 4, an exemplary Sales Manager meeting screen 450 is depicted in FIG. 12. The user/sales representative reaches meeting screen 450 by selecting button 212 on the lower navigation bar. A graphical image of a hypothetical sales manager 454 is preferably provided on Sales Manager meeting screen 450. Sales manager 454 is preferably positioned in front of or adjacent a box 456 that appears to be a white board in his/her office. Alternative graphical presentations are contemplated and selection of different visual images of the sales manager and/or setting may be made by the administrator and/or user, as noted previously. A navigation bar 458 is typically provided in association with box 456 to permit the user/sales representative to view all available "needs," as discussed herein.

Based on the questions asked by the user/sales representative on the sales call, a series of needs appears on the manager's white board 456. The needs triggered by the call upon the sales lead are supplemented with global needs that are generally not directly related to the information gleaned from the question/answer exchange with the sales lead. Of note, the list of "needs" that appears on the manager's white board is directly influenced by the prior decisions and activities undertaken by the user/sales representative, so that a user/sales representative who has failed to make appropriate preparations/perform appropriate research and/or who has failed to exercise sound judgment in interviewing his/her sales lead, will have generally poor needs from which to choose. Once again, the user/sales representative is required to select items from a list provided according to the disclosed scenario, with input and/or responses provided by sales manager 454 based upon the responses associated with such needs by the administrator, as described with reference to FIGS. 10 and 11.

Input and/or responses from the sales manager are generally provided to the user/sales representative at various junctures in his/her needs analysis. Thus, the sales manager may comment on the needs selected by the user/sales representative, e.g., endorsing and/or questioning the relevance of a selected need based on the sales lead's responses during the sales call. The sales manager's input and/or responses are advantageously programmed into the disclosed system/method and are triggered based on the rating of such need(s), e.g., good, bad or neutral. Moreover, the sales manager may direct/encourage the user/sales representative to revisit earlier aspects of the scenario, e.g., the file review portion to complete necessary background research. A direction to return to earlier stages in a scenario is typically predicated on the system/method determining that the user/sales representative has not achieved the necessary performance level at such earlier stage(s) to successfully complete the scenario. Of note, scenarios created according to the present disclosure may include sales manager's that provide faulty and/or erroneous advice, and users/sales representatives are free to accept or ignore the sales manager's advice/encouragement based on his/her perception of the quality/reliability of such advice/encouragement.

Figure 13:
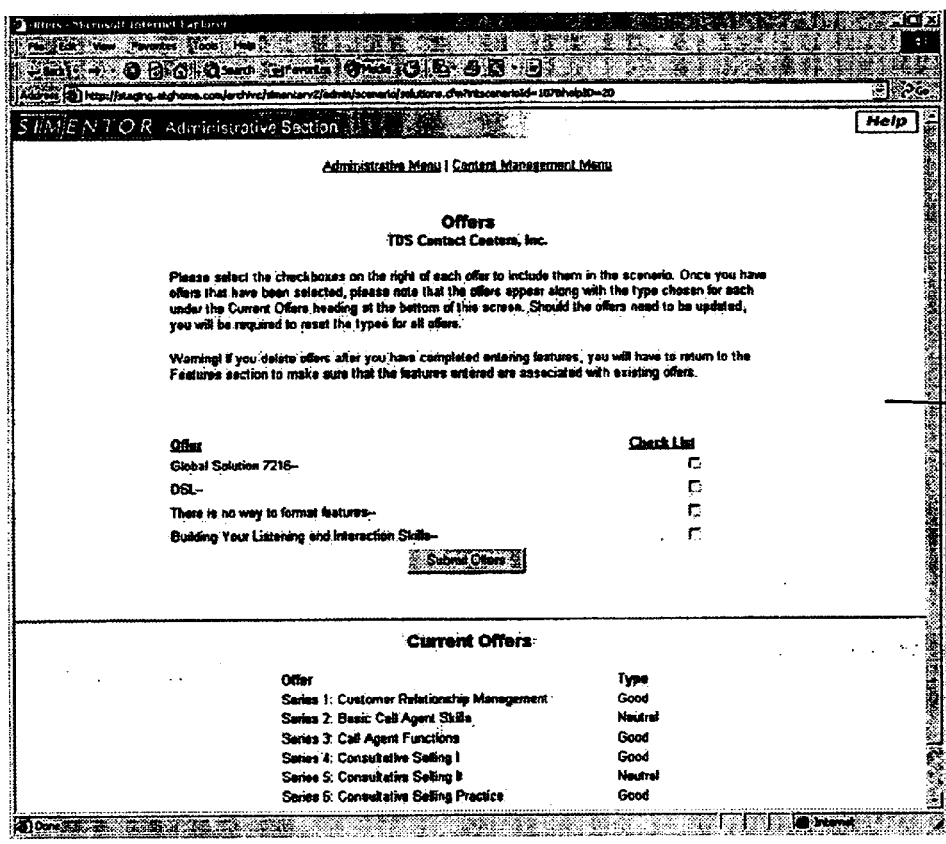
FIG. 13 is an exemplary "offers" administrative screen according to an embodiment of the present disclosure.
Figure 14:
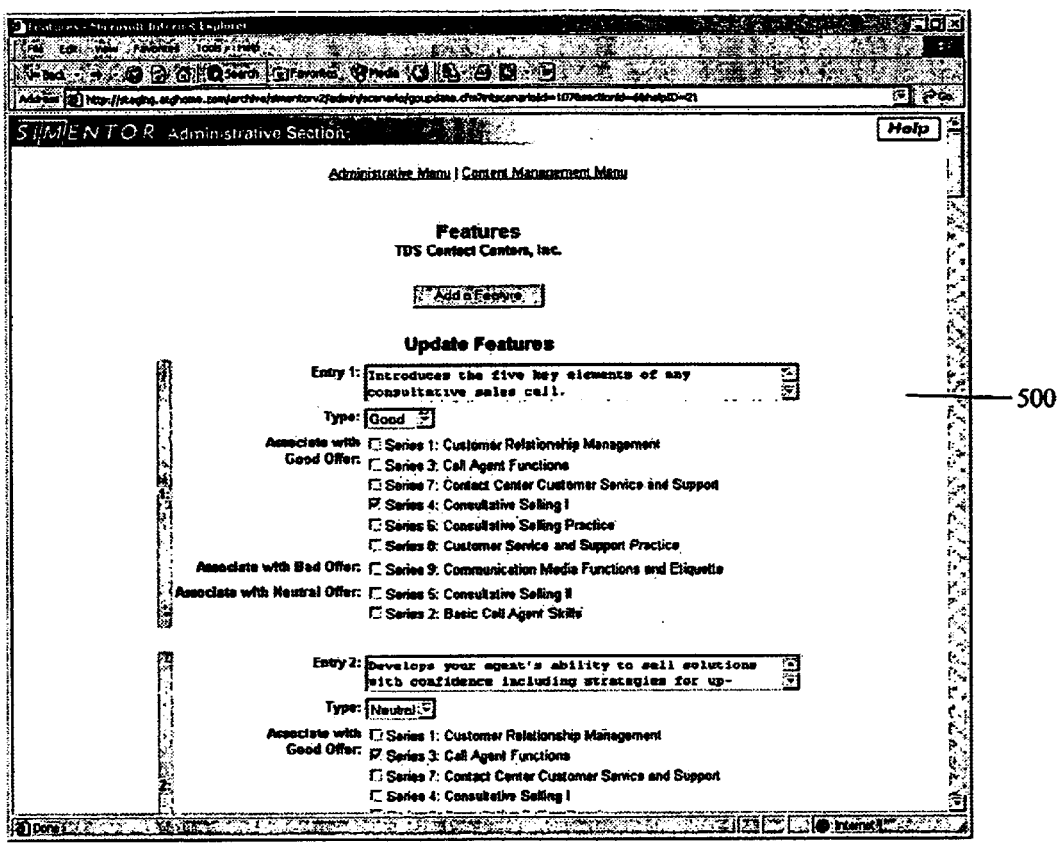
FIG. 14 is an exemplary "features" administrative screen according to an embodiment of the present disclosure.

Turning to FIGS. 13 and 14, further functionalities associated with administrative aspects of the disclosed system/method are depicted. FIG. 13 shows an Offer administrative screen 470 for establishing potential product/service offerings according to a disclosed scenario. The potential product/service offerings preferably correlate with products/services commercially available (or under development) by or from a company for which the user/sales representative works. The product/service offering list is advantageously updated on a periodic basis to reflect new/revised/discontinued product/service offerings. An administrator typically selects a series of offers from the list of potential offerings for inclusion in the scenario.

For each of the product/service offerings selected on Offers administrative screen 470, the administrator correlates the product/service offering with "features" on Features administrative screen 500. In each case, the administrator also assigns a rating or "type" to each such offering/feature based on the desirability of the offering/feature to the sales lead. If the delineated offering/feature correlates well with the requirements of the sales lead, a "good" rating is warranted. However, if the offering/feature does not correlate with the needs of the sales lead, a lower rating is warranted. According to the exemplary information set forth on Features administrative screen 500, it is clear that the "Series 4: Consultative Selling I" is a good product/service offering for the hypothetical sales lead, whereas the second entry is merely neutral.

Figure 15:
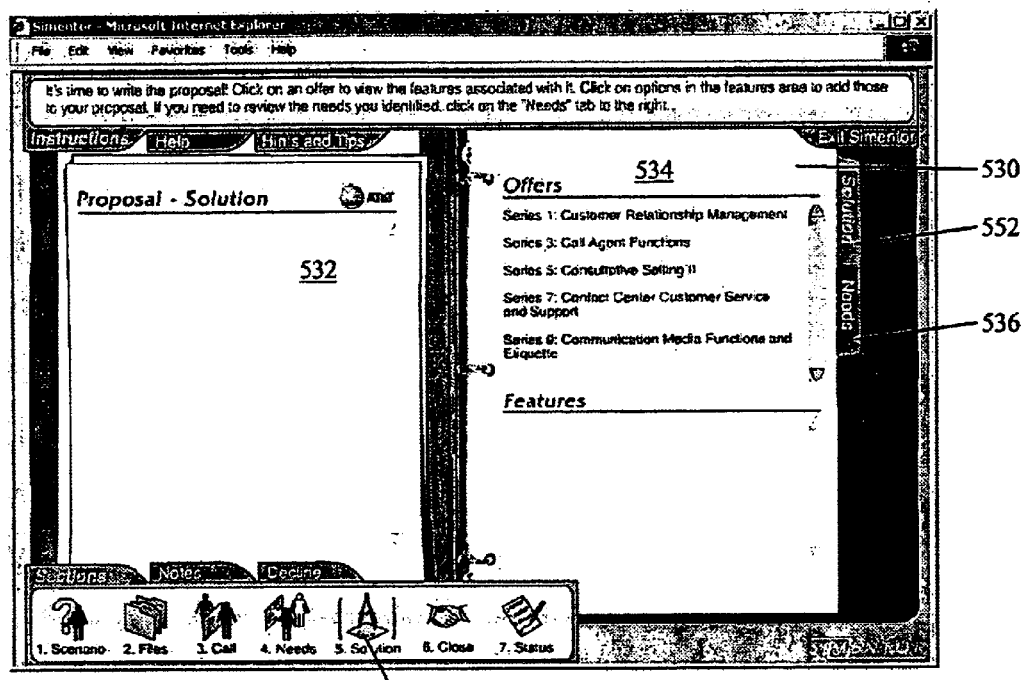
FIGS. 15 and 16 are exemplary "proposal" screens for a scenario according to an embodiment of the present disclosure.
Figure 16:
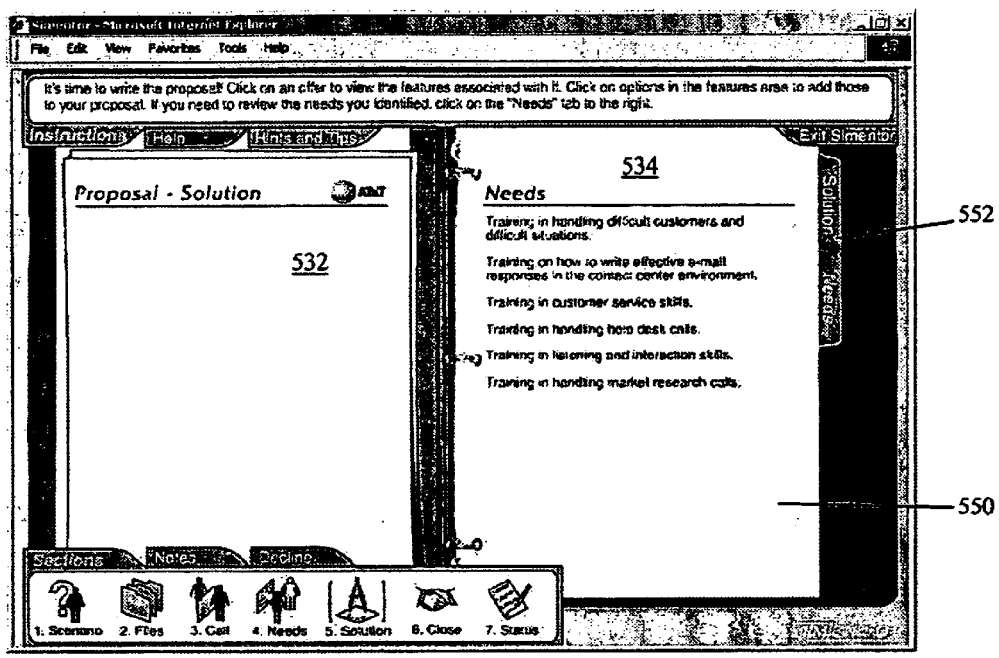

With reference to FIG. 15, a Proposal screen 530 is depicted on which the user/sales representative formulates his/her solution for presentation to the sales lead. The user/sales representative reaches Proposal screen by clicking on Solution button 214 in the lower navigation bar. The graphical imagery associated with exemplary Proposal screen 530 features a three-ring binder image, with the ultimate Proposal-Solution being formulated on the left page 532, and the potential Offers and associated Features appearing on the right page 534. Of note, the user/sales representative is able to turn to the "needs" identified in his/her session with his/her sales manager by turning to Needs tab 536. As shown in FIG. 16, clicking on Needs tab 536 causes the identified needs to fill the right page 534 in alternative Proposal screen 550. The user/sales representative can quickly refer back to the Offers/Features of FIG. 15 by clicking on the Solution tab 552. Thus, the user/sales representative may seek product/service offerings that include features correlative with the identified needs of the hypothetical lead. The potential product/service offerings for inclusion in the Proposal-Solution for the hypothetical sales lead are limited to those offerings selected by the administrator in connection with Offers administrative screen 470, as described hereinabove.

Figure 17:
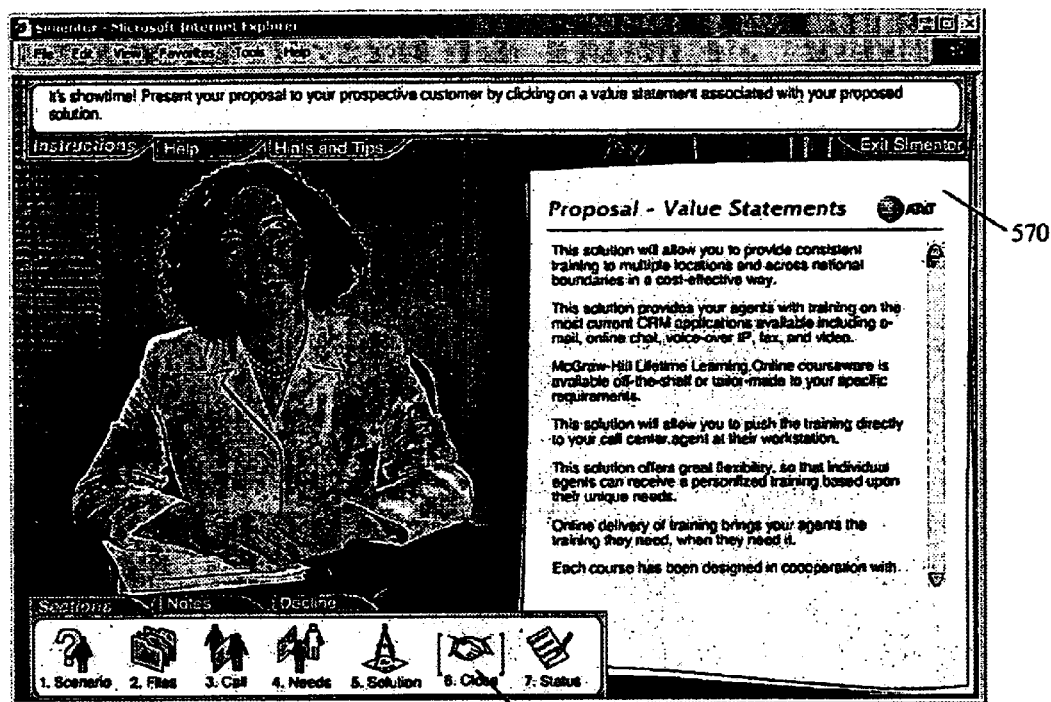
FIG. 17 is an exemplary "closing" screen for a scenario according to an embodiment of the present disclosure.

FIG. 17 illustrates a Closing screen 570 in connection with a scenario created according to an embodiment of the present disclosure. Closing screen 570 is accessed by clicking on Close button 216 in the lower navigation bar. As a final step in the illustrative scenario, the user/sales representative is required to select an appropriate "Value Statement" that reflects the proposal-solution that he/she has prepared for the hypothetical sales lead. The value statements are entered in an appropriate administrative screen according to the present disclosure. Once again, the graphical imagery provided according to the illustrative embodiment of FIG. 17 includes an individual sitting at her desk, attentive to the proposal being made, and the visual image (s), e.g., body language, communicated by such individual in response to value statement(s) proposed by the user/sales representative are advantageously designed to provide further input/information as to the effectiveness/relevance of the selected value statement(s).

Figure 18:
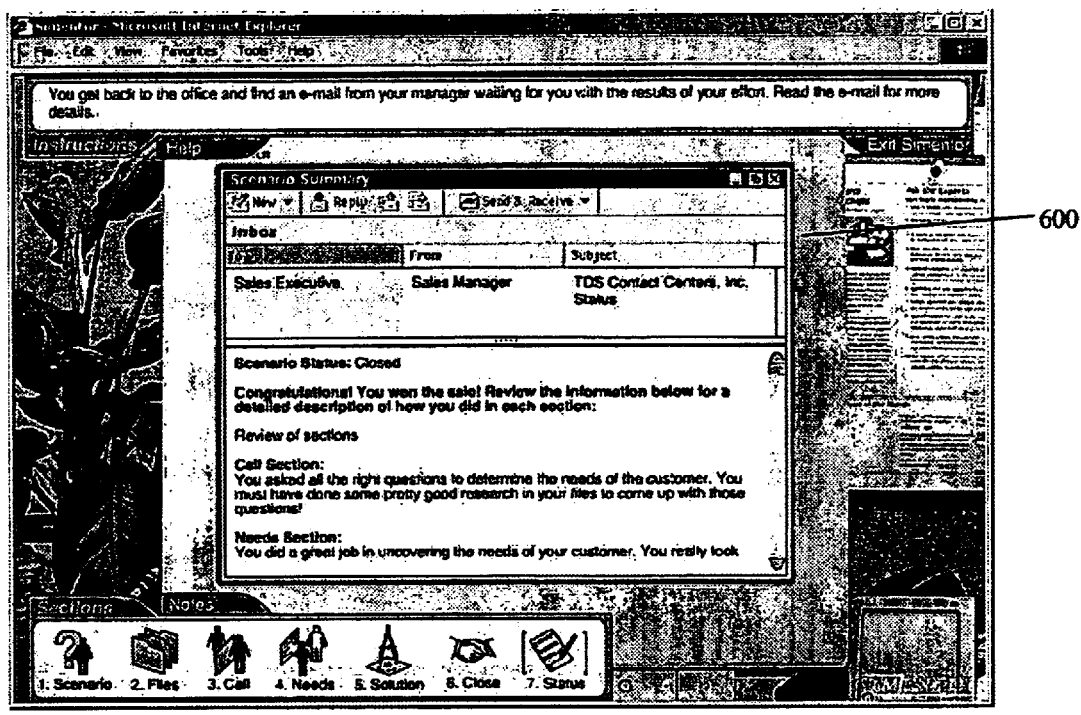
FIG. 18 is an exemplary "status" screen for a scenario according to an embodiment of the present disclosure.

With reference to FIG. 18, completion of the illustrated scenario is effectuated by a hypothetical e-mail message from the sales manager advising the user/sales representative as to the outcome of the proposal-solution, as depicted on Status screen 600. In the illustrated scenario, the user/sales representative was successful in gaining the sale, reflecting the effectiveness of the user/sales representative in identifying the sales lead's needs, and matching those needs with product/service offerings that satisfied those needs. Of note, the hypothetical e-mail message advantageously provides a recap of the user's performance at various stages in the scenario, based on data captured with respect thereto.

Figure 19:
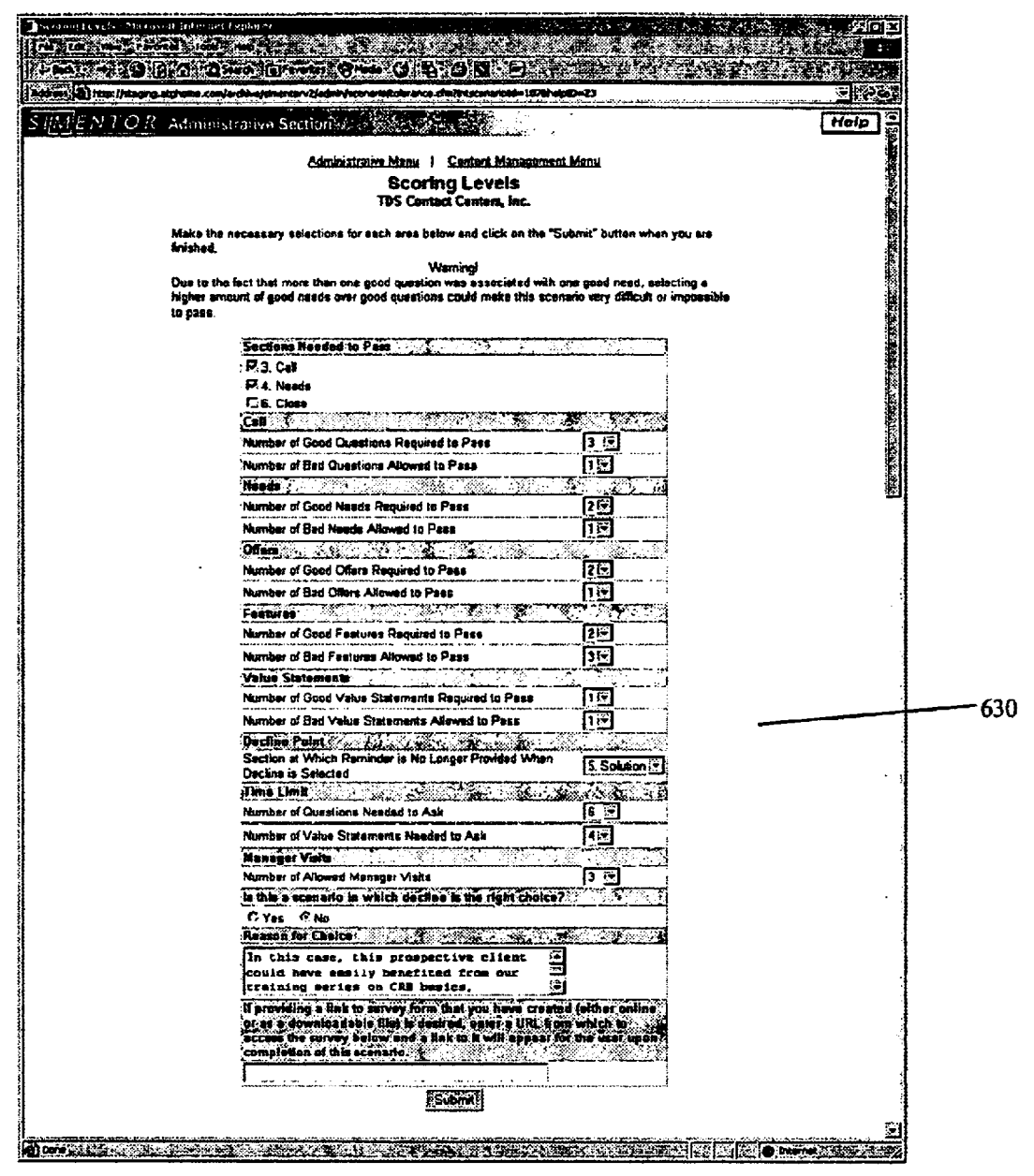

In determining whether a positive outcome is to be communicated to the user/sales representative, a scoring protocol is advantageously established according to preferred embodiments of the present disclosure. Thus, with reference to FIG. 19, an exemplary Scoring Levels administrative screen 630 is depicted. By selecting appropriate threshold levels of performance by users at various stages in a scenario, an administrator is able to establish the level of performance required to "pass" the scenario, e.g., gain the sale in a sales training scenario. Of note, it is contemplated that performance levels may be established both for positive actions, e.g., asking a minimum number of "good" questions and making a minimum number of "good" offers, and for avoidance of negative actions, e.g., asking no more than a threshold level of "bad" questions. It is further contemplated that a decision by the user/sales representative to "decline" the sales lead is the appropriate outcome for a scenario, and in such circumstance, the scoring protocol advantageously is weighted and/or establishes a requirement that the user/sales representative decline the sales lead to successfully complete the scenario.

The thresholds may be varied based on a variety of factors, e.g., based on the skill/experience level of users. Of note, the scoring protocol described herein is particularly effective and efficient in its implementation because the administrator is required to include good, bad and neutral elements at every stage in his/her creation of the underlying scenario, thereby ensuring applicability of the scoring protocol to all scenarios created according to the present disclosure. Moreover, the disclosed scoring protocol(s) permit scenario(s) to be scaled based on the skill level of participants, e.g., by reducing the permitted number of "bad" questions from one to zero for a particularly skilled/experienced user/sales representative. Such scaling of the scoring protocol is advantageously performed automatically by the disclosed system/method through an algorithmic adjustment to the scoring protocol, e.g., based on registration information and/or prior performance of a user/sales representative.

Figure 20:
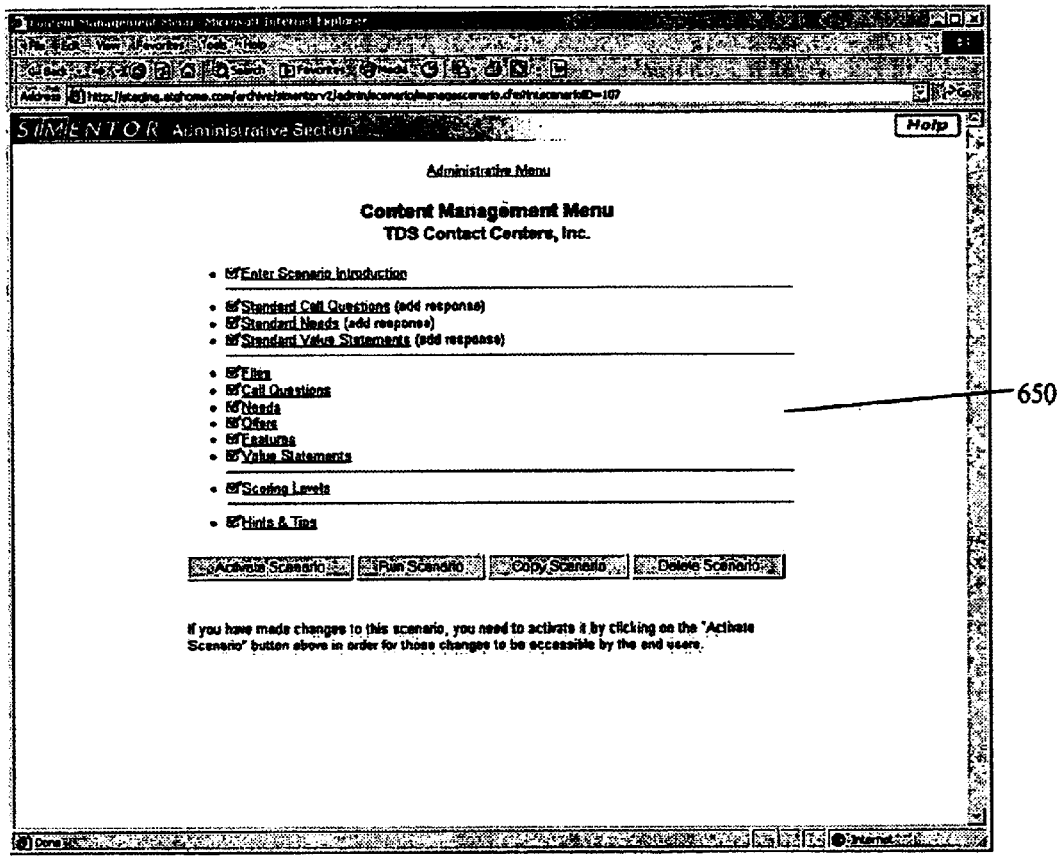
FIG. 20 is an exemplary "content management menu" administrative screen according to an embodiment of the present disclosure.
Figure 21:
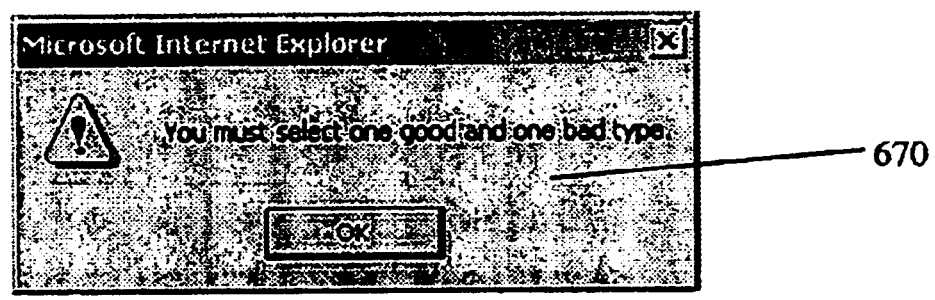
FIG. 21 is an exemplary administrative warning screen according to an embodiment of the present disclosure.

Indeed, as illustrated in the exemplary Content Management Menu screen 650 of FIG. 20, an administrator is apprised according to the present disclosure the degree to which a scenario complies with all requirements for implementation. For example, a failure to include the minimum required number of files (e.g., three) in a scenario would prevent a check from appearing adjacent the "Files" designation on Content Management Menu screen 650 and, in like measure, would prevent implementation of the subject scenario. Content Management Menu screen 650 provides a useful reference source with respect to creation and implementation of a scenario, and each designation on screen 650 provides a link to the relevant administrative screen for appropriate review and corrective action. Additionally, as shown in FIG. 21, administrative warning screen(s) 670 are provided to administrators when there actions in creating a scenario fail to satisfy minimum requirements and/or contravene applicable guidelines and/or protocols.

Having thus described preferred embodiments and exemplary uses/applications of the present disclosure, it is to be understood that the specifically disclosed applications are merely illustrative of the scope of the present disclosure. Various changes may be made in the function and arrangement of aspects hereof; equivalent means may be substituted for those described and/or illustrated; and certain features may be used independently from others without departing from the spirit and scope of the invention as defined in the claims that follow.

What is claimed is:

1. A system for use in creating an interactive educational module, said system comprising:
   a) an administrative interface that includes a plurality of predetermined links for accessing predefined screens for use in inputting information associated with creation of said interactive educational module, wherein at least one of said predetermined links provides access to a predefined input screen that is designed and configured to receive: (i) a plurality of questions that relate to said interactive educational module, (ii) a single predefined answer for each of said plurality of questions, and (iii) a rating for each of said plurality of questions, said rating reflecting a relative quality of said question, independent of said answer, for eliciting information in said interactive educational module and being selected from a predefined rating scale that includes at least three distinct rating classifications;
   b) a scoring system that utilizes said rating of each question to calculate a performance level of a user of said interactive educational module, wherein the performance level is based on a user's ability to select a question from a plurality of questions; and
   c) an adjustable performance metric against which said performance level is compared.

2. A system according to claim 1, wherein said plurality of predetermined links provide access to predefined screens for inputting information associated with said interactive educational module, said information being selected from a group consisting of interactive educational module subject matter, questions associated with said interactive educational module, needs associated with said interactive educational module, offers and features associated with said interactive educational module, value statements associated with said interactive educational module, and combinations thereof.

3. A system according to claim 2, wherein said interactive educational module subject matter information is selected from a group consisting of module name, module description, product description, industry description, need description, customer description, competitor description, segment description, geography description, and combinations thereof.

4. A system according to claim 1, wherein said at least three rating classifications include good, bad and neutral ratings.

5. A system according to claim 1, further comprising a verification system.

6. A system according to claim 1, wherein said administrative interface includes an alert system that provides a tangible signal if said ratings fail to satisfy predetermined ratings criteria.

7. A system according to claim 1, further comprising an activation system that prevents activation of said interactive educational module if said ratings fail to satisfy predetermined ratings criteria.

8. A system according to claim 1, wherein access to said administrative interface is controlled by password protection.

9. A system according to claim 1, wherein said predefined input screen includes predefined informational content for use in creating said interactive educational module.

10. A system according to claim 9, wherein said administrative interface includes at least one link to a predefined screen for input and modification of said predefined informational content.

11. A system according to claim 9, wherein said predefined input screen is designed and configured for use in customizing said predefined informational content.

12. A system according to claim 1, further comprising a reporting system that generates at least one report reflecting performance levels for users of said interactive educational module.

13. A system according to claim 1, wherein at least one of said plurality of predetermined links provides access to a predefined scoring input screen that is designed and configured to receive operative parameters for said scoring system.

14. A system according to claim 1, wherein said scoring system is responsive to at least one attribute of a user of said interactive educational module.

15. A system according to claim 14, wherein said at least one attribute of a user of said interactive educational module is selected from a group consisting of user experience level, user skill level, prior user interactions with said interactive educational module, and combinations thereof.

* * * * *